(12) United States Patent
Hickman et al.

(10) Patent No.: US 6,996,609 B2
(45) Date of Patent: Feb. 7, 2006

(54) METHOD AND APPARATUS FOR ACCESSING A WIDE AREA NETWORK

(75) Inventors: Paul L. Hickman, Los Altos Hills, CA (US); Michael Gough, Ben Lomond, CA (US)

(73) Assignee: G&H Nevada Tek, Incline Village, NV (US)

( * ) Notice: Subject to any disclaimer, the term of this patent is extended or adjusted under 35 U.S.C. 154(b) by 0 days.

(21) Appl. No.: 08/847,921

(22) Filed: Apr. 28, 1997

(65) Prior Publication Data

US 2001/0033564 A1 Oct. 25, 2001

Related U.S. Application Data

(60) Provisional application No. 60/016,680, filed on May 1, 1996, and provisional application No. 60/016,873, filed on May 6, 1996.

(51) Int. Cl.
*G06F 13/00* (2006.01)

(52) U.S. Cl. ............................. 709/218; 709/232; 707/1
(58) Field of Classification Search ......... 370/351–360; 379/88, 96, 67, 87, 97, 89, 67.1, 88.13; 704/270, 704/271, 275; 395/500, 200.49, 200.48, 200.57; 709/218, 217, 219, 204–207, 228, 232; 707/101, 707/2, 1
See application file for complete search history.

(56) References Cited

U.S. PATENT DOCUMENTS

| | | | | |
|---|---|---|---|---|
| 5,732,216 A | * | 3/1998 | Logan et al. ................. | 348/13 |
| 5,781,901 A | * | 7/1998 | Kuzma ......................... | 707/10 |
| 5,794,039 A | * | 8/1998 | Guck ............................ | 395/683 |
| 5,854,897 A | * | 12/1998 | Radziewicz et al. ... | 395/200.54 |
| 5,870,454 A | * | 2/1999 | Dahlen ..................... | 379/88.14 |
| 5,884,032 A | * | 3/1999 | Bateman et al. ....... | 395/200.34 |
| 5,884,262 A | * | 3/1999 | Wise et al. ................ | 704/270 |
| 5,889,951 A | * | 3/1999 | Lombardi ................... | 709/218 |
| 5,908,467 A | * | 6/1999 | Barrett et al. .............. | 709/218 |

OTHER PUBLICATIONS

Jeremy Carl, "Empowering the Blind", Apr. 29, 1996, reprinted from Web Week, vol. 2, Issue 5, Apr. 29, 1996, Mecklemedia Corp.

(Continued)

*Primary Examiner*—Ajit Patel
(74) *Attorney, Agent, or Firm*—Hickman Coleman & Hughes, LLP

(57) ABSTRACT

A voice web browser system includes a telephone, an access system coupled to a TCP/IP network, a telephone system coupling the telephone to the access system, and a speech-to-text system for "reading" text that had been sent over the TCP/IP network to the telephone user. Preferably, the access system receives TCP/IP packets from web pages accessible over the TCP/IP network and parses the HTML code of the web pages into text and non-text portions, such that the text portion can be read to the telephone user. A computer implemented process for obtaining web page information over a TCP/IP network includes implementing a connection of a telephone user to an access system that is coupled to a TCP/IP network, detecting a selection of at least one navigation command by the telephone user to access a web page accessible over the TCP/IP network, and navigating over the TCP/IP network to the web page in response to the navigation command, resulting in a verbal communication of at least some information derivable from the web page to the telephone user. A method for retrieving e-mail that was sent over a TCP/IP network includes calling from a user telephone to an access computer coupled to a TCP/IP network, providing user identification to the access computer, retrieving e-mail via the access computer that was sent over the TCP/IP network and addressed to the user, and reading the e-mail to the user of the user telephone utilizing a text-to-speech system.

20 Claims, 23 Drawing Sheets

OTHER PUBLICATIONS

Associated Press, "Software lets the blind browse the Web", Feb. 3, 1997, USA Today High–Tech.

The Productivity Works, Inc., Web pages, earliest listed update Sep. 4, 1996, http://www.prodworks.com.

Paul M. Eng, Editor, "E–Mail is only a Phone Call Away", Jul. 8, 1996, Business Week.

Paul M. Eng, Editor, "This New Browser Can Read from the Net—Aloud", Aug. 5, 1996, Business Week.

John W. Verity, Editor, "Web Magic: From Posting an Audio Cyberspiel . . . ", Aug. 12, 1996, Business Week.

NetPhonic Communications, Inc., "No Matter How Many Hits Your Web Site Gets . . . ", Product Brochure, received Jan. 15, 1997.

J.M., "1–800–The–Web", 1996 No. 4, Inc. Technology.

Diana Hwang & Steven Burke, "Developers Spin a Web for Voice", Dec. 18, 1995, p. 231, Computer Reseller News 1995.

Margie Semilof, "NetPhonic Gives Web Servers a Voice", Mar. 25, 1996, p. 36, CommunicationsWeek 1996.

Ed Leivowitz, "Netphonic's Web–On–Call—CT–Access for Your Mom", Apr., 1996, Computer Telephony.

John W. Verity, "Pick Up the Phone and Go Surfing", Mar. 11, 1996, Business Week (reprinted from Business Week Web Site, http//www.businessweek.com).

Netphonic Communications, Inc., "Web–On–Call(TM) Voice Browser Redefines Access to the Web", Press Release Mar. 4, 1996, Downloaded from the WWW on May 1, 1996, Netphones Communications, Inc.

Netphonic Communications, Inc., "Web–On–Call(TM) Voice Browser" and accompanying letter, received by mail Aug. 2, 1996 with letter dated Jul. 24, 1996, Netphonics Communications, Inc.

Netphonics Communications, Inc., "Thank you for your interest in . . . ", Revision Date May 28, 1996, Web Page downloaded from WWW on Jul. 21, 1996, Netphonics Communications, Inc. Web Site.

* cited by examiner

THIS IS THE ABOUT MOO-COW PAGE FOR MOO-COW INDUSTRIES. MOO-COW SPECIALIZES IN              164

{4:http://spiffytalk.com/-moo.cow/cowrepair/}COWREPAIR        178
{5:http://spiffytalk.com/-moo.cow/cowservice}COWSERVICE
{6:http://spiffytalk.com/-moo.cow/cowtowing}COWTOWING 176   FOR MORE INFORMATION ABOUT WHAT A COW IS,   180
      CHECK THE {7:http://www.bovine.com} BOVINE
      HOME PAGE.

METHOD AND APPARATUS FOR ACCESSING A WIDE AREA NETWORK

CROSS-REFERENCES TO RELATED APPLICATIONS

This application claims the benefit of U.S. provisional patent application No. 60/016,680 filed May 1, 1996, the disclosure of which is incorporated herein by reference, and U.S. provisional patent application No.60/016,873 filed May 6, 1996, the disclosure of which is incorporated herein by reference. This application is related to U.S. patent application No. 08/847,816, filed concurrently with this application, and since abandoned, the disclosure of which is incorporated herein by reference.

TECHNICAL FIELD

This invention relates generally to computer networks and, more particularly to wide area networks such as the Internet.

BACKGROUND ART

The origins of the Internet date back several decades to a U.S. government sponsored military/educational/business wide area network (WAN) that was designed to remain operational even in the event of the catastrophe, e.g. a major earthquake or a nuclear war. To accomplish this goal, robust protocols and systems were developed which allowed a geographically distributed collection of computer systems to be connected as a WAN such that the loss of a particular computer, or group of computers, would not preclude the continued communication among the remaining computers.

While the use of the Internet has been prevalent for many years now, its use has been limited by the arcane and difficult commands required to access the various computers on the network. To address this problem, a protocol known as the "World Wide Web" or "WWW" was developed to provide an easier and more user-friendly interface for the Internet. With the World Wide Web an entity having a domain name creates a "web page" which provides information and, to a limited degree, some interaction with the entity's "web site."

A computer user can "browse", i.e. navigate around, the WWW by utilizing a suitable web browser and an Internet service provider. For example, UUNET, America Online, and Global Village all provide Internet access. Currently, the most popular web browser, known as the Netscape® Navigator® is made by Netscape Corporation of Mountain View, Calif. The web browser allows a user to specify or search for a web page on the WWW, and then retrieves and displays the home page of the desired web page on the user's computer screen.

While the Internet, in general, and the World Wide Web, in particular, are extremely popular, the computer apparatus typically used to access the services is quite expensive. For example, a contemporary Pentium® or Macintosh® computer system capable of running state-of-the-art web browsers costs many thousands of dollars. There are many potential users of the World Wide Web and other Internet services who simply do not wish to pay that much for access to those services.

To partially address the cost problem, at least one company has announced a "Web Appliance" which permits web browsing when coupled to either a television receiver or to a computer monitor. More particularly, Japan Computer Corporation, USA (JCC) announced in a news release entitled "JCC Announces 'Web Toaster' and 'Web Copier' Home/Office Universal Internet Access Devices" on Feb. 20, 1996 that the iBOX Communicator series would be demonstrated at the Email World, Web World, and Internet Expo shows at the San Jose Convention Center on Feb. 20–21, 1996. However, both the Web Toaster and the Web Copier still cost many hundreds of dollars, and must be used with other expensive equipment such as a television receiver or video monitor. Therefore, a user must still invest in hundreds, if not thousands, of dollars worth of hardware and software in order to access the World Wide Web and other Internet services when using a Web Appliance.

In a news release dated Mar. 4, 1996, downloaded from the WWW on May 1, 1996, NetPhonic Communications, Inc. announced "Web-On-Call Voice Browser" which reportedly will be able to access certain Web documents with a touch-tone telephone, cellular telephone, or facsimile machine. The browser reportedly uses text-to-speech technology that can play back Web documents over the telephone. It is also said to "support documents retrieved via fax, e-mail and postal mail service." The Web-On-Call Voice Browser was said to be available in "mid-1996." The news release reported that "NetPhonic Communications will be demonstrating Web-On-Call Voice Browser in Booth #2027 at Computer Telephony Expo 96 at the LA Convention Center in Los Angeles Mar. 12–14, 1996."

A reading of the NetPhonic materials, downloaded from the WWW, reveals a database management system that runs on a web server. More specifically, the software "turns a Web document database into a 'Unified Information Store' that serves as the single repository of information to be distributed over the Internet, phone connection, wireless delivery, fax transmission or postal mail system. A Web server then becomes a paradigm-independent unified server that can supply information to telephone callers and e-mail users as well as Web browser users — all from one low-maintenance database."

As is evident from the foregoing, the NetPhonic Web-On-Call Voice Browser therefore allows a telephone user to call-in to a web site and to access data stored in the 'Unified Information Store', where that information is also available through the WWW. Therefore, the NetPhonic software would not appear to be a true web browser, in that it does not appear to permit a telephone user to access any web page on the WWW. The NetPhonic software is, in essence, a web server manager, in that it creates a database dedicated to a particular web server and allows telephone and other access to that web server's database. Furthermore, the NetPhonic software does not permit telephone users to create their own web pages, or perform certain other common Internet functions.

In consequence, heretofore it was necessary for a user to purchase, rent, lease or borrow expensive computer equipment, and learn how to use it properly, in order to access and make use of the many capabilities of the Internet. The resultant cost and technical sophistication barriers excluded millions of users from accessing the WWW and other Internet features such as electronic mail (e-mail), electronic publishing, electronic news services, etc.

DISCLOSURE OF THE INVENTION

The present invention uses an ordinary touch-tone telephone to provide access to many of the features of the Internet, including e-mail, the ability to "cruise" the World Wide Web, and the ability to create and edit web pages. Since virtually everyone has access to a telephone (which can cost as little as $15–$20 to purchase), the many resources of the Internet are much more universally accessible due to of the methods, apparatus and systems of the present invention.

Briefly, the invention includes an Internet Interface Computer coupled to one or more telephone lines, and an Internet Server coupling the Internet Interface Computer to an Internet Service Provider. Alternatively, the Internet Interface Computer and the Internet Server can be provided as a single computer system. Still more alternatively, the Internet Interface Computer, Internet Server, and Internet Service Provider can be provided as a single computer system. The incoming telephone lines can be normal toll telephone lines, 1-800-telephone lines, 1-900-telephone lines, 1-976-telephone lines, or any other type of analog or digital telephone line supported by the local telephone system.

The Internet Interface Computer serves as an interface between audio (e.g. voice and DTMF) communication with a telephone and digital communication with an Internet Server. In particular, the Internet Interface Computer provides text-to-speech capabilities which allows text derived from TCP/IP packets that were received via the Internet to be "read" to a telephone user. The Internet Interface Computer is also responsive to DTMF tones of the telephone when a user of the telephone presses telephone buttons. One embodiment of the Internet Interface Computer also provides speech recognition to convert spoken commands of the telephone user to a format that can be understood by the Internet Interface Computer.

Preferably, the Internet Interface Computer waits in an "event loop" for a telephone user to "call-in" to the service. Once a call has been detected, the Internet Interface Computer "picks-up" the phone line and "reads" a series of options to the telephone user. By "read", "speak", and the like it is meant herein that the computer uses text-to-speech software to convert machine-readable text stored in its memory to a spoken (audio) output. The Internet Interface Computer then enters an event loop waiting for a response from the telephone user. This response can take the form of a dual-tone, multi-frequency ("DTMF") signal made by pressing a key on the touch-tone pad of telephone, or can be the spoken command of the telephone user. Such commands include creating a World Wide Web ("WWW") page, editing a WWW page, accessing a WWW page, to "cruising" or "browsing" the Internet, or to sending electronic mail ("e-mail") to a designated address on the Internet. The Internet Interface Computer is capable of handling multiple telephone input lines simultaneously, thereby providing simultaneous access to the Internet by a number of telephone users.

By using the apparatus and processes of the present invention, a telephone user has audio access to the World Wide Web, Internet e-mail, and other Internet services. For example, a telephone user can send voice mail and e-mail to other Internet users, can receive voice mail and e-mail from other Internet users, can create an "audio" web page which can be accessed by anyone having a web browser, can "cruise" or "browse" on the World Wide Web by having the Internet Interface Computer convert the text of web pages to a synthesized reading of the text, can have pre-arranged telephone conversations with other Internet users, etc. The apparatus of the present invention can be accessed from any type of telephone, including home telephones, business telephones, pay telephones, cellular telephones, air telephones, marine telephones, etc. This provides inexpensive and nearly universal access to the Internet and to the World Wide Web.

In one preferred embodiment of the present invention, a caller's telephone number is used as an identification of the identity of that caller. This permits the apparatus of the present invention to automatically recognize a user from the "caller-ID" provided by many telephone systems. Alternatively, a user can enter their telephone number to provide a caller-ID. If multiple users use the same telephone number, extensions can be provided to identify a particular individual. In any case, a password ("keyword") is preferably used to confirm the identity of the user.

The precise implementations of the systems, methods, and apparatus of the present invention are dependent upon the business model that is chosen. For example, if a centralized 1-900 number is used as the entry to the Internet Interface Computer, allowing country-wide toll-plus-service-charge access to the computer, users across the country are automatically billed by their local telephone company for access to the service. If 1-976 numbers (which are similar to 1-900 number but which are regional in nature) are used, then local "feeder servers" are preferably used to access a database of a "master server." If regular toll-lines are used (where the telephone user is charged only for the telephone tolls), the use of "feeder servers" and a "master server" is again preferable. With regular toll-lines, the present invention preferably takes a two-tier model, where a first-tier of service allows Internet browsing and is supported by the sale of audio commercials "narrowcast" ("read") to the telephone user, and where a second-tier of service that allows for the creation of web pages, the use of voice-mail and e-mail, and is supported by monthly telephone user payments.

Major advantages of the present invention therefore include nearly universal access to the Internet and World Wide Web at a relatively low cost. For example, virtually every person can, by using a telephone, add their own web page to the World Wide Web. Furthermore, anyone with a telephone will be able to receive Internet e-mail. In addition, users of the system will be able to communicate verbally with other users at, potentially, a fraction of the cost of normal telephone charges.

These and other advantages of the present invention will become apparent upon reading the following detailed descriptions and studying the various figures of the drawings.

BRIEF DISCRIPTION OF THE DRAWINGS

FIG. 16 illustrates a method of the converter of FIG. 8a;

FIG. 17 illustrates a process of the plug-in, under the control of the player of FIG. 8a;

BEST MODES FOR CARRYING OUT THE INVENTION

Figure 1:
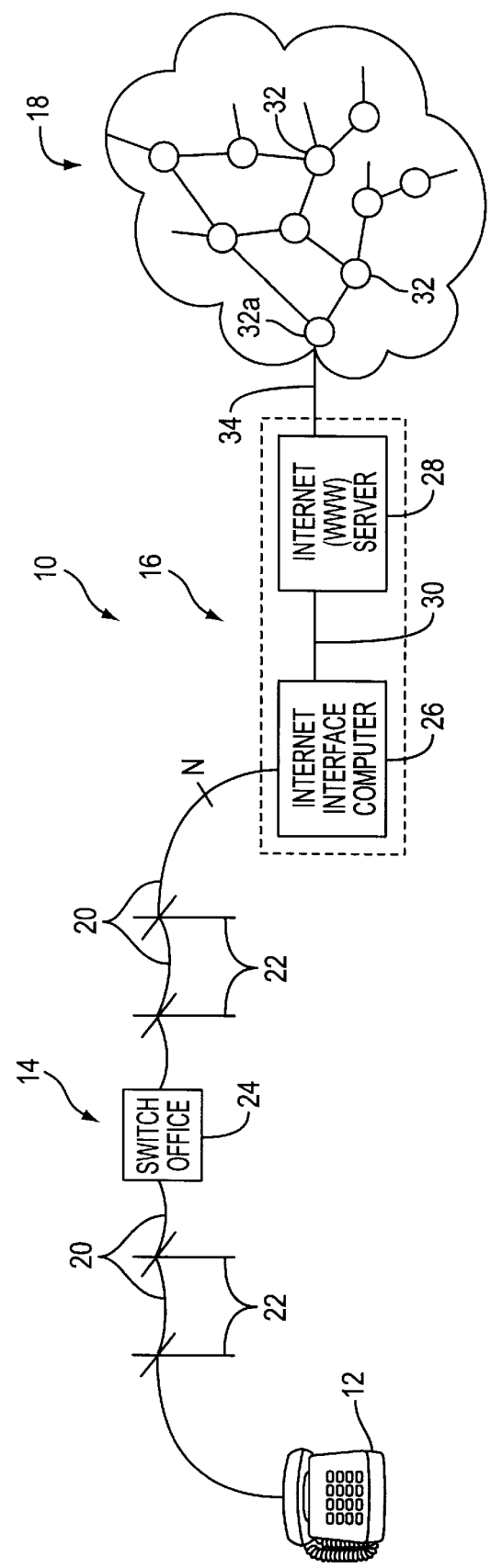
FIG. 1 is a block-diagram of a system in accordance with the present invention for accessing a Wide Area Network (WAN) such as the Internet.

In FIG. 1, a system 10 illustrating a method and apparatus for accessing a Wide Area Network such as the Internet is illustrated in block-diagram form. The system 10 includes a touch-tone telephone 12, a telephone system 14, a Telephone-to-Internet access system 16, and the Internet 18.

As noted, the Internet is one form of a wide area network (WAN). When accessing the Internet via the World Wide Web (WWW) protocol, data is sent in the form of TCP/IP packets. The Internet is therefore one instance of a TCP/IP network including a number of nodes, as described previously. Computer systems coupled to, thereby becoming part of, the TCP/IP network "host" web pages comprising HTML code that can be transmitted via TCP/IP packets over the TCP/IP network. Private Intranets (i.e. private networks utilizing TCP/IP protocols) are other instances of TCP/IP networks. A preferred embodiment of the present invention operates in conjunction with TCP/IP networks, as described.

The telephone 12 can be an ordinary touch-tone telephone. Alternatively, the telephone can be any electronic device emulating the functionality of a telephone, such as a personal computer. In addition, other forms of telephones, including rotary dial telephones, direct-connect (i.e. "dial-less") telephones, etc. can be used. The telephone 12 is connected to the Telephone-to-Internet access system 16 by a telephone system 14. The telephone system 14 is illustrated schematically as a land-line system having telephone wires 20 supported by telephone poles 22 and directed by one or more switch offices 24. Of course, this is a highly stylized representation of a telephone system 14 which typically also includes multi-level switching stations, relays, microwave links, fiber optic links, satellite communications, underground wire systems, etc. It is therefore intended that this representation of a telephone system 14 represents a telephone such as it is typically provided by public and private utilities.

A Telephone-to-Internet access system 16 of the present invention includes an Internet Interface Computer 26 and an Internet Server 28. It should be noted that the functionality of the Internet Interface Computer 26 and Internet Server 28 can be provided on two or more stand-alone computer systems, or may be integrated on a single computer system. For example, the Internet Interface Computer 26 can be a personal computer (PC) such as an Intel Corporation Pentium®-based computer system, while the Internet Server 28 can be a UNIX®-based system available from such companies as Silicon Graphics, Inc., Sun Microsystems, Inc., Hewlett-Packard Company, etc. Alternatively, a single, powerful computer system running, for example, Microsoft Windows NT can provide the functionality of both the Internet Interface Computer 26 and the Internet Server 28.

For the purpose of discussion herein, it will be assumed that the Internet Interface Computer 26 is preferably a Pentium-class personal computer system operating under the Windows 95 or Windows NT operating systems, or a Power-PC Macintosh computer. The Internet Server 28 will be assumed to be preferably a UNIX-based system running a commercially-available Internet and World Wide Web Server software package on, preferably, a Silicon Graphics UNIX workstation. The Internet Interface Computer 26 is preferably coupled to the Internet Server 28 by an Ethernet® 3connection 30.

As noted in FIG. 1, a number N of telephone lines can be handled by the Telephone-to-Internet access system 16. These telephone lines can be standard telephone ("toll") lines, ISDN telephone lines, T1 telephone lines, 1-800 telephone lines, 1-900 telephone lines, 1-976 telephones lines, etc. In general, a telephone line 20 connected to the Telephone-to-Internet access system 16 can be any form of telephone line or telephone communication link supported by the telephone system 14. For the purposes of this invention, the important criteria is that a user can access the system 16 with a telephone 12, not the manner in which the user is connected to the system 16. The manner of connection can be important to the business model for commercializing the invention, however, e.g. whether the telephone line is toll-free, a toll charge, a 1-900 number, etc., as discussed previously.

The Internet 18 is shown in a schematic form to have a number of "nodes" 32, comprising computer systems such as routers, switches, etc. Internet Server 28 is coupled to Internet Service Provider node 32a to provide access to the rest of the Internet 18. It should be noted that the functionality of the Internet Service Provider node 32a can be integrated with the Internet Server 28 and/or the Internet Interface Computer 26.

In general, there is a hierarchy of Internet Service Providers (or "hosts") commercially available depending upon the bandwidth of communication desired between the System 16 and the Internet 18. For example, if a single "b" channel or a double "b" channel of an ISDN telephone line is used as the connection 34 between the Internet Server 28 and the Internet Service Provider node 32a, a relatively low-order Internet Service Provider node 32a can be used. A single ISDN "b" channel carries a theoretical 64 kilobits of information per second (effectively about 56 kilobits/second), and a dual "b" channel ISDN line carries a theoretical 128 kilobits/second (effectively about 112 kilobits/second). Alternatively, if a T1 line was used as the connection 34, a theoretical 1.5 megabits of information per second can be carried and a higher-order Internet Service Provider node can be used. Such connections 34 between an Internet Server 28 and an Internet Service Provider node 32a are commercially available and are typically handled by the Internet Service Provider.

Figure 2:
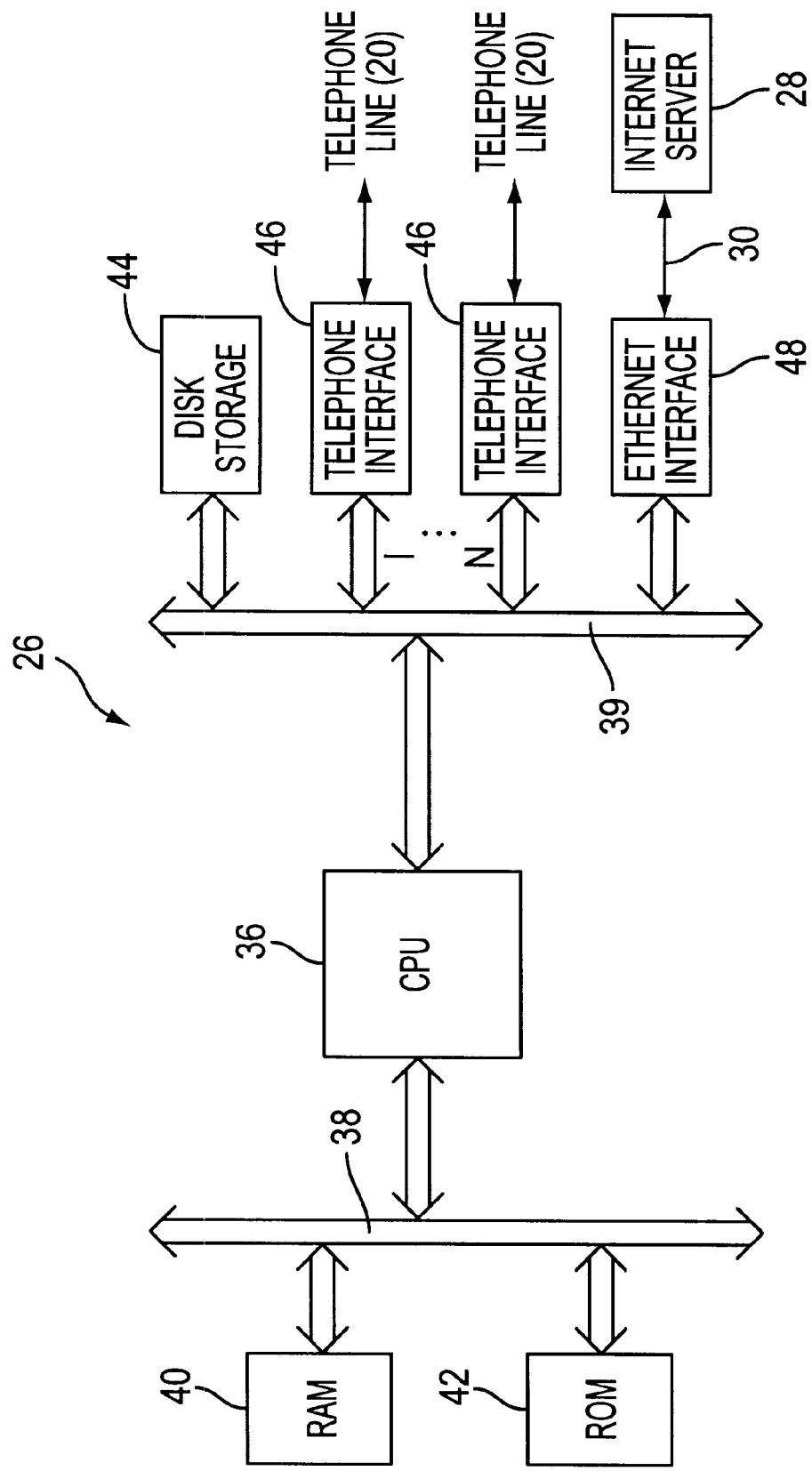
FIG. 2 is a block-diagram of an Internet Interface Computer of FIG. 1 in accordance with the present invention.

In FIG. 2, an Internet Interface Computer 26 is illustrated in block-diagram form. The Internet Interface Computer 26 is preferably a personal computer, such as a Pentium-class computer system available from a variety of manufacturers. More particularly, computer 26 includes a CPU 36 coupled to a high speed ("memory") bus 38 and to a slower input/output ("I/O") bus 39 with interfacing logic, as it is well-known to those skilled in the art. Random access memory (RAM) 40 and read only memory (ROM) 42 are typically coupled to the memory bus 38 although, in some instances, RAM 40 and ROM 42 may be coupled, instead, to the lower speed I/O bus 39.

The CPU 36 is preferably a Pentium-class microprocessor, as mentioned before. Typically, the CPU 36 is combined with a commercially available "chip set " to control the buses 38 and 39, the memories 40 and 42, etc. as it is well-known to those skilled in the art. The RAM 40 serves as temporary or "scratch pad " memory, and ROM 42 includes the basic input/output system (BIOS) and other "firmware" for the computer system 26.

A variety of I/O devices are coupled to the CPU 36 by the I/O bus 39. For example, disk storage 44 is preferably coupled to the I/O bus 39 to provide a non-volatile read/write memory storage for the computer system 26. Disk storage 44 can be a hard disk drive, a floppy disk drive having removable floppy disks, or the like. Also coupled to the I/O 39 are a number of telephone line interfaces 46 which are coupled telephone lines 20. In this instance, there are N telephone interfaces 46 to couple to N telephone lines 20. Also, coupled to the I/O bus 39 is an Ethernet interface 48 which is coupled by an Ethernet link 30 to the Internet Server 28.

As mentioned previously, computer systems 26 are commercially available and their operation is well-known to those skilled in the art. Likewise, telephone interfaces 46 are commercially available, as are Ethernet interfaces 48. Therefore, the construction and use of a computer system 26, in accordance with the block diagram of FIG. 2 is well-known to those skilled in the art.

Figure 3:
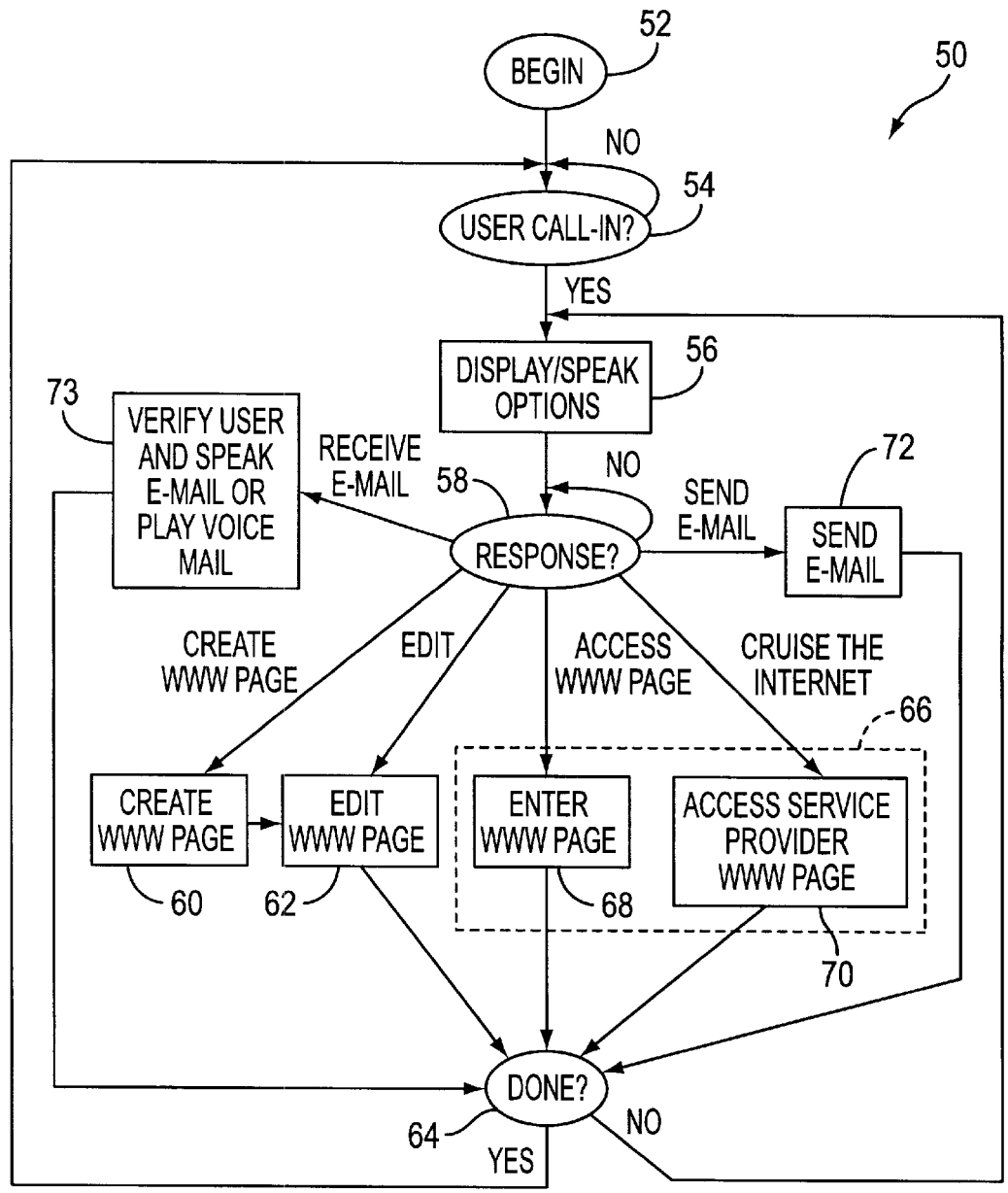
FIG. 3 is a flow-diagram of a method for accessing a Wide Area Network (WAN) such as the Internet in accordance with the present invention.

In FIG. 3, a process 50 for accessing a wide area network, such as the Internet, is shown in the form of a flow diagram. This process 50 is a computer-implemented process, preferably running on the Internet Interface Computer 26 of FIG. 2. More particularly, a computer program encoding the process 50 can be stored on the disk storage 44 (one example of a "computer readable media"), within RAM 40 (another example of a "computer readable media"), and can be executed by the CPU 36.

In FIG. 3, the process 50 begins at 52 and, in a step 54, it is determined if there is a user call-in. If not, the step 54 goes into a "event loop" until a user does call-in. A "call-in" is detected by a telephone interface card 46 which puts a signal or "interrupt" on the I/O bus 39 that can be detected by the CPU 36 executing the process 50 of the present invention. If a user call-in is detected in step 54, a step 56 displays/speaks the options available. If a telephone 12 is being used to access the Internet Interface Computer 26, the options are spoken (i.e. there is verbal communication to the user of the telephone) since most telephones do not have display options. If, however, the telephone 12 is provided with a display (such as a LCD flat panel display), the options can also be visually displayed. Next, a step 58 waits for a response from the telephone user. If there is no response, a step 58 goes into an event loop. There preferably is a "time-out" (not shown, but well known to those skilled in the art) which takes the process 50 out of the event loop of step 58 if the user has not responded within a pre-determined period of time. If there is a response from the telephone user, the step 58 will branch accordingly.

The step 58 can determine if there is a response in several different ways. A preferred method for detecting a response is to detect a dual-tone multi-frequency (DTMF) signal sent by the telephone 12 when the user presses one or more of the touch-tone keys of the telephone keypad. For example, pressing the "1" key will produce a first DTMF tone, and pressing the "8"key will produce another DTMF tone. In this way, the telephone user can respond in step 56 to a "menu" of options provided by the process 50. Alternatively, the response can be spoken by the telephone user. This requires voice recognition technology, which is quite effective if the vocabulary of the voice recognizer is small. For example, a voice recognition system which recognizes the numbers 0 –9, yes, no, and perhaps a few dozen other words is relatively inexpensive and tends to be quite accurate. For voice recognition systems with large vocabularies, the accuracy level tends to drop and the cost tends to increase. However, the costs of voice recognition systems are continuously decreasing and the capabilities of such systems are continuously increasing, which makes the voice recognition option increasingly attractive. Therefore, a preferred embodiment of the present invention utilizes voice inputs from the user of the telephone 12 to enter information and commands to the Internet Interface Computer 26.

If step 58 detects a response, process 50 branches appropriately. For example, if the response is "Create WWW Page", process control branches to a step 60 where a WWW page is created and then to a step 62 where the WWW page is edited. Next, a decision step 64 determines whether the user is done and, if so, process control branches to step 54 to await another user call-in. If the telephone user is not done, step 64 branches to a step 56 where the options are again provided to the user.

If the response detected by step 58 is "Access WWW Page" or "Cruise" ("Browse") the Internet, there is an appropriate branch to an Internet Browser ("WWW browser") 66. More particularly, if the response is "Access WWW Page", the user enters their own WWW home page in a step 68. When the user leaves their home page, process control is returned to step 64. Alternatively, if the response detected by step 58 is "Cruise the Internet", a service provider WWW home page (for example) is accessed in a step 70. When the user leaves the service provider WWW home page, process control is returned to step 64. If the response detected by step 58 is "send e-mail", a step 72 sends the e-mail and process control is turned over to step 64. Finally, if the response is "receive e-mail", a step 73 verifies the identity of the telephone user, and either plays a voice mail message to the telephone user or "read" an e-mail message to the telephone user, preferably utilizing text-to-speech technology. The display/speak option step 56, and steps 60, 62, 66, and 68–73 will be discussed in greater detail subsequently.

It is therefore clear from the forgoing, that a computer implemented process of the present invention first implements the connection of a telephone user to an access system that is coupled to a TCP/IP network. As explained previously, this "implementing a connection" can involve the telephone user calling in to the access system via the telephone system or by some other communication channel. However, the access system can also initiate the call to the telephone user. Next, there is typically some form of verbal communication with the telephone user in the form of a greeting or the like, although such verbal communication is optional. The access system then detect the selection of one or more navigation commands by the telephone user via DTMF signals, voice command, etc., in order to access a desired web page over the TCP/IP network. The access system then navigates over the TCP/IP network to the web page, and then makes a verbal communication of at least some of the information derivable from the web page to the telephone user. The verbal communication can be accomplished by "playing" a recorded verbal communication, or by parsing text from non-text portions of the HTML of the web page, and "reading" some or all of the text portions of the web page to the telephone user using a suitable text-to-speech system. Player systems for recorded verbal communication and text-to-speech systems are commercially available.

Figure 4:
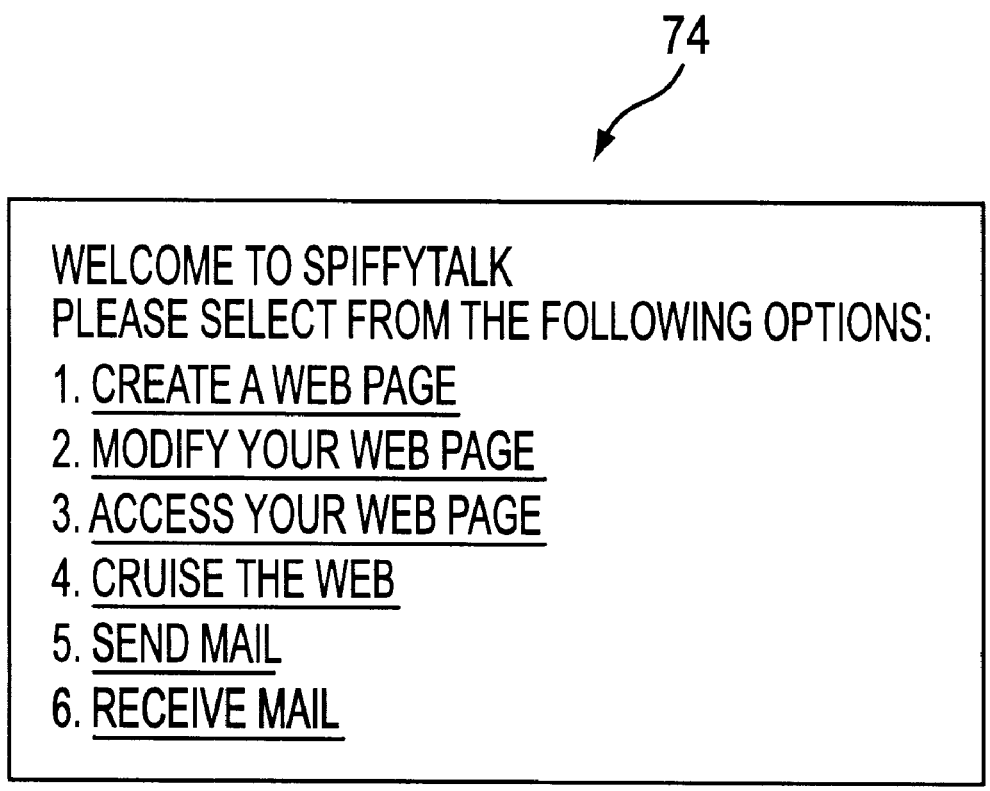
FIG. 4 is a list illustrating the "Display/Speak Options" step of FIG. 3.

FIG. 4 illustrates the step 56 of FIG. 3. More particularly, FIG. 4 illustrates the display/speak option step 56 of the process 50 of the present invention. If the telephone 12 has a visual display feature, or if the telephone 12 was being emulated by a personal computer or an Internet Appliance, an option screen 74 is shown on the visual display. However, since most telephones do not have displays capable of displaying screen 74, Internet Interface Computer 26 will instead "read" or "speak" the contents of the option screen 74. This is accomplished as will be appreciated by those skilled in the art, by a text-to-speech synthesizer, which are commercially available. More exactly, the step 56 of FIG. 3 provides the following greeting when a caller calls in from a telephone:

"Welcome to SpiffyTalk. Please select from the following options. One. create a web page. Two. Modify your web page. Three. Access your web page. Four. Cruise the web. Five. Send mail. Six. Receive mail."

Therefore, as will be appreciated from the illustration of FIG. 4, the step 56 of FIG. 3 will provide a greeting and a numbered menu of options for use by the telephone user. The telephone user can then select one of these options by pressing the appropriate touch-tone button on the keypad of their telephone. For example, if they wish to access their own web page, they will press the "3" button on their telephone, and if they wish to "cruise" the web, they will press the "4" button on their telephone.

To receive "mail", button 6 can be pressed on the user's telephone. The access system then retrieved voice mail or e-mail that was designated for that user. In the case of voice mail, the message is simply played to the telephone user. In the case of e-mail, the message can be "read" to the telephone user using a text-to-speech system. It is preferably that both a user ID and a password be required for access to mail, to ensure the security of that mail.

Figure 5:
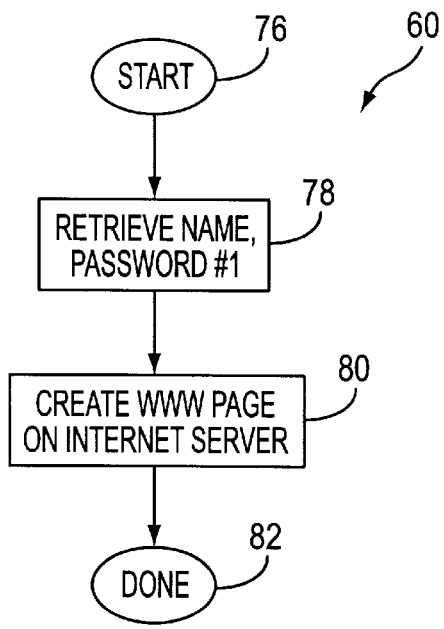
FIG. 5 is a flow-diagram illustrating the "Create WWW Page" step of FIG. 3.

In FIG. 5, the "Create WWW Page" step 60 of FIG. 3 is illustrated in greater detail. More particularly, process 60 begins at 76 and, in a step 78, the name and a first password ("keyword") is retrieved from the telephone user. This name and password can be retrieved in several ways. For example, voice recognition technology can be used to retrieve the name and the password. Alternatively, the name and password can be coded in on the touch tone pad of the telephone 12. For example, the name could be spelled as follows. If the telephone user's name is "Bob", the "2" key, which corresponds to the letters "ABC", can be pressed twice, followed by the "*" key, to indicate the second letter of "ABC", i.e. "B." Then, the "6" key, which corresponds to "MNO", can be pressed three times followed by the "*" key to indicate the third letter "O" in the string "MNO." Finally, the "2" key can be pressed twice, followed by the "*" key, to indicate "B" again. This would indicate to the computer 26 that the name of the user is "BOB." Other alphanumeric information can also be entered into the system in this fashion, although special button sequences must be provided for the letters "Q" and "Z", which do not appear on a standard telephone keypad. Numeric information can be entered by simply pressing the button with that number. Therefore, if the first password is simply numeric, it can be entered by simply using the touch-tone numeric keypad. The first password can also be alphanumeric and entered as explained above.

The present invention also includes a specialized keyboard that emulates the DTMF coding described above. The keyboard is either coupled to the telephone line, or is acoustically coupled to the hand-set of the telephone, as will be appreciated by those skilled in the art. Pressing a key of the keyboard results in the audio encoding of that key in DTMF tones that is transmitted over the telephone line. For example, pressing the "B" key on the keyboard produces the same pattern of DTMF tones as described above, namely, the tone associated with the "2" key of the telephone will be made twice, followed by the tone associated with the "*" key of the telephone. These tones can be produced quite rapidly, resulting in little or no delay on the part of the typist. In this way, each of the keys of the keyboard can be encoded in DTMF tones for receipt by the Internet Interface Computer of the present invention. By providing a keyboard that communicates with DTMF tones, expensive modems and keyboard processors can be eliminated.

Using the name and the first password as entered by, for example, one of the above methods, the process creates a World Wide Web (WWW) "home page" written in HTML and stores it on the Internet Server 28. There are many commercially available tools for creating WWW pages. The created home page is preferably linked to a master home page or "domain home page" for the service, e.g. the "SpiffyTalk" home page in this example. This is because second level domain names such as "spiffytalk.com" need to be registered on the Internet before they can be used. The first level domain name is "com", and other first level domain names are, for example, "gov", "edu", "net" for government, educational, and network entities, respectively. However, this is anticipated to be a commercial service, so a first level domain name of "com" is considered appropriate. However, "users" within a domain, such as the hypothetical 37 Bob" can have a "home page" as a user of the domain that is subsidiary to the domain home page. For example, Bob can have the home page "http://www.spiffytalk.com/~bob/" which does not have to be registered on the Internet and can be maintained by the Internet Server 28 itself. Therefore, a WWW page can be created instantly by a telephone user without having to register a name on the Internet using the system of the present invention. The process is then completed as indicated at 82.

Figure 6:
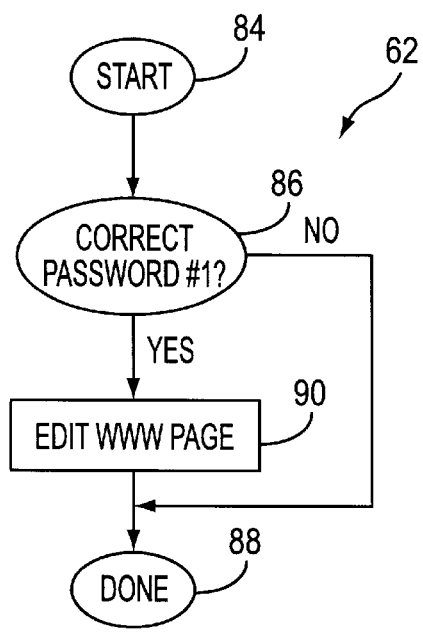
FIG. 6 is a flow-diagram of the "Edit WWW Page" step of FIG. 3.

In FIG. 6, the "Edit WWW Page" step 62 of FIG. 3 is illustrated in greater detail. More particularly, process 62 begins at 84 and, in a step 86, it is determined if the correct password has been entered. If not, the process terminates as indicated at 88. If the correct password was provided at step 86, the WWW page is edited in a step 90. Again, editors for WWW pages are commercially available and are well-known to those skilled in the art.

Figure 6A:
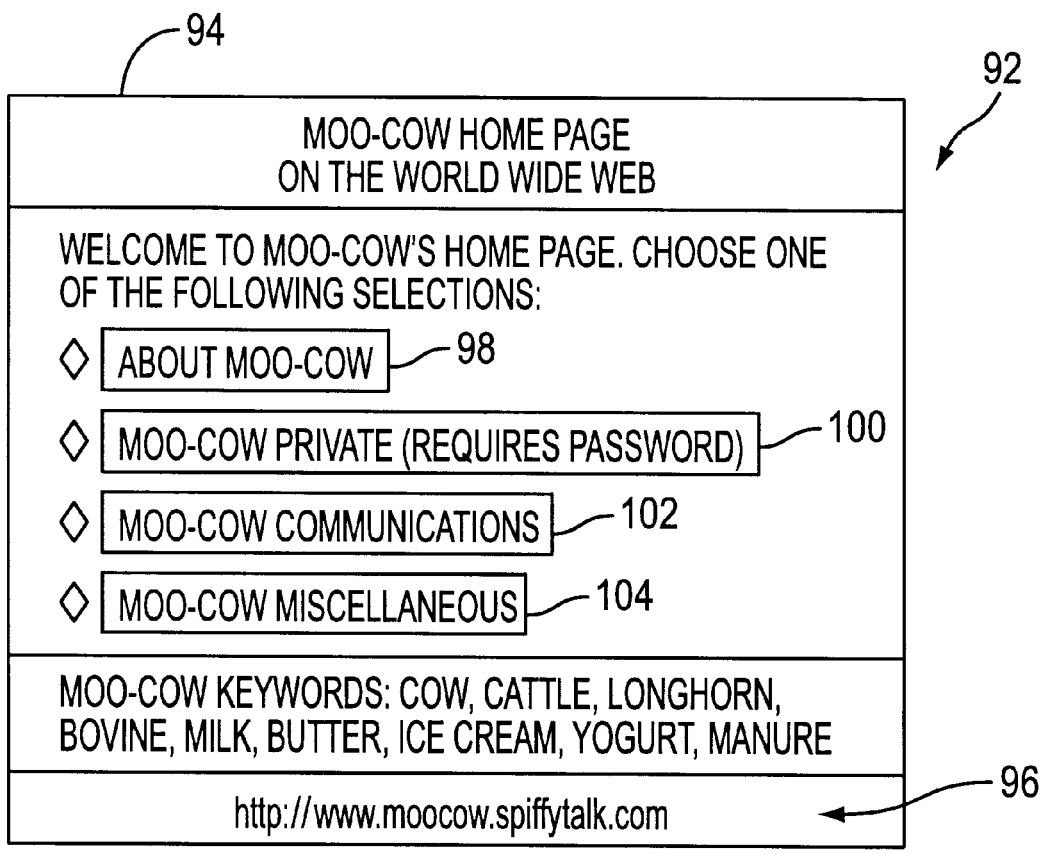
FIG. 6a illustrates a sample "Voice Web Page" created by the processes of FIGS. 5 and 6.

FIG. 6a illustrates a World Wide Web user "home page" created by the processes of FIGS. 5 and 6. The web page belongs to "Moo-Cow" and is assigned the Internet address http://www.spiffytalk.com/~moo-cow/. As mentioned previously, the second level domain names, namely the domain name "spiffytalk.com" needs to be registered on the Internet. However, the domain user name "moo-cow" can be assigned and served by the Internet Server 28 of the present invention. Therefore, a large number of telephone users can each create their own home pages by calling into the Telephone-to-Internet access system 16 of the present invention.

The step 80 of FIG. 5 creates the "home page" 92 by placing the name 94 retrieved in step 78 into appropriate name slots on the page. In other words, everywhere on page 92 that the name "moo-cow" appears, there was a blank name slot. The step 80 also creates the appropriate user address 96 for the user home page 92.

The edit step 90 of FIG. 6 permits the moo-cow passwords such as "cow," "cattle," etc. to be entered into the home page to provide passwords for searching over the Internet. These passwords can be used to index the home page into lists such as Yahoo!® and Lycos®. If a home page is started for a telephone user for "Bob" of the previous example, the process of the present invention would produce a home page with the name "Bob" instead of the name "moo-cow" and of course, with a different address 96 and different passwords that "Bob" would select and/or enter.

The home page 92 includes four pre-defined hyperlinks 98, 100, 102, and 104. The hyperlink 98 is "About Moo-Cow," the hyperlink 100 is "Moo-Cow Private (Requires Password)," hyperlink 102 is "Moo-Cow Communication," and hyperlink 104 is "Moo-Cow Miscellaneous." The hyperlink 98 is linked to a web page that can be created and modified by the telephone user which explains the business of the company, or has a biography of an individual for individual users. The hyperlink 100 is linked to a web page including private information and functions that requires a password (i.e. a password #2) for entry. Hyperlink 102 is linked to a communications web page for moo-cow, where e-mail and voice mail can be sent and received, and where the telephone user can have a conversation with another telephone user over the Internet. This is accomplished by one telephone user or another "posting" themselves onto the communications web page, and the other user selecting the posted user for two-way telephone conferences over the Internet. Software for Internet telephony using personal computers is commercially available. Finally, hyperlink 104 links to a web page for miscellaneous and user-defined uses.

It should also be noted that the Internet and WWW protocols also support sound per se. Therefore, instead of entering text into a web page, which might have to be subsequently converted to sound with a text-to-speech engine, voices and other sounds can be directly entered into the web page. In this way, the recorded voices and other sounds can be "played back" from the web page, either into a telephone or into any computer that has a web browser capable of supporting sound outputs.

It should be noted that the process of the present invention creates "Voice-Web" pages, where a user needs only use a telephone to create and edit a personal web page. These Voice-Web pages can be accessed by any web browser on a personal computer coupled to the Internet. If a personal computer using, for example, Netscape Navigator opens a Voice-Web page, the visual image (with sounds, if any) can appear on the screen of the personal computer, and the Voice-Web page can be operated the same way as any other web page on the WWW.

Figure 7:
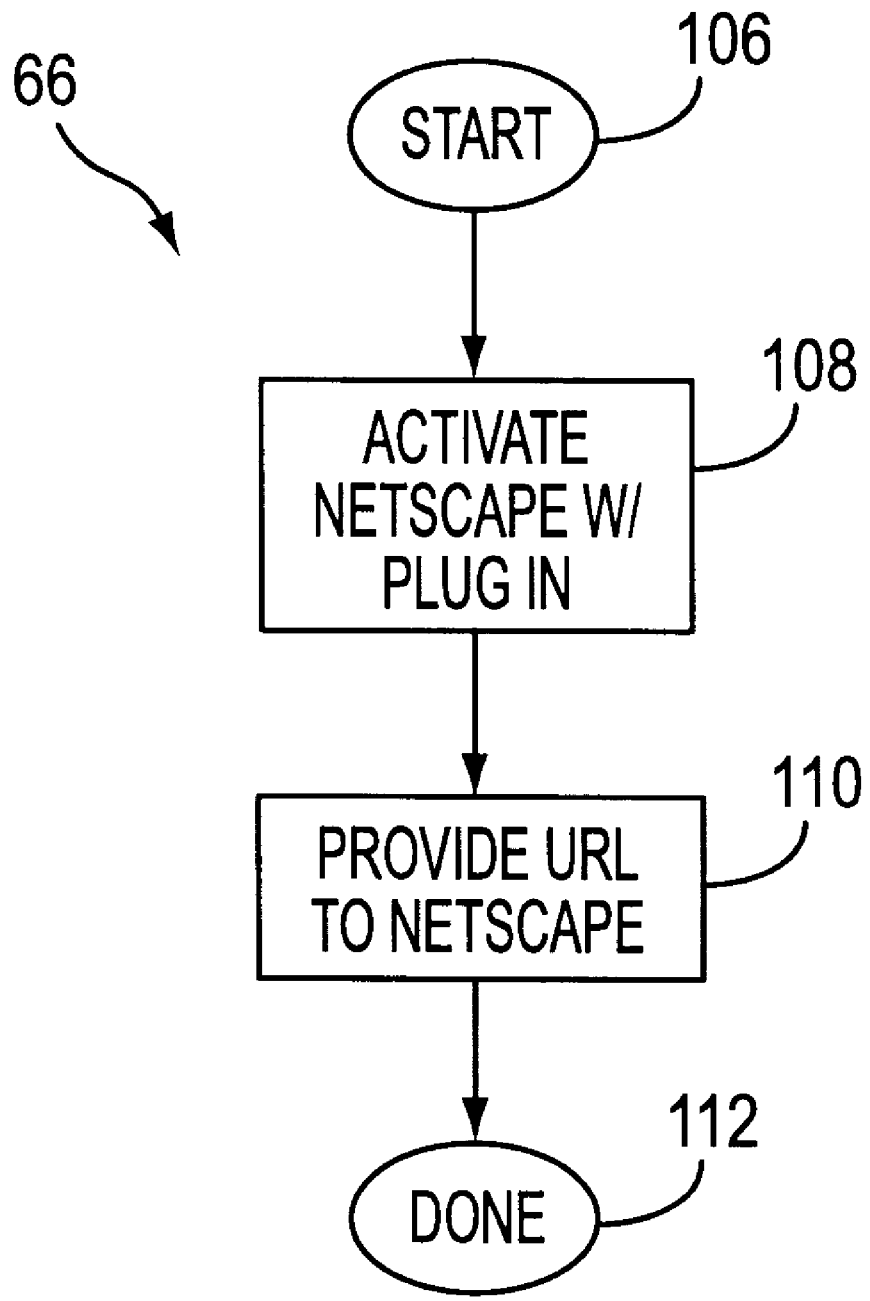
FIG. 7 is a flow-diagram of the "Enter WWW Page" and "Access Server Provider WWW Page" steps of FIG. 3.

FIG. 7 is a flow-diagram illustrating the Internet browser function 66 of FIG. 3. In other words, the process 66 of FIG. 7 implements the process of steps 68 and/or 70 of FIG. 3. The process 66 begins at 106 and, in a step 108, a web browser such as Netscape Navigator with a plug-in of the present invention is started. Netscape Navigator (which may also be referred to herein as "Netscape browser", "Navigator", or simply "Netscape") is commercially available and is also available for free downloading over the Internet. Next, in a step 110, the Universal Resource Locator or "URL" is provided to the Netscape browser, and the process is completed at step 112.

With reference to both FIGS. 7 and 3, in the case of entering a telephone user's own WWW page in a step 68, the URL ("WWW address") is preferably http://www.<service provider name>.com/~<user name>/ If, however, the telephone user wishes to access the World Wide Web for some "browsing" in step 70, the URL is preferably the URL of the service provider, namely http://www.<service provider name>.com. From there, the telephone user can browse the Internet using any one a number of available search engine such as Yahoo!, Lycos, etc.

With respect to step, the step 108 of FIG. 7 "Activate Netscape With Plug-In", it should be noted that Netscape is a convenient platform for this process 108 since it is currently the most popular Internet "browser" and because it has powerful plug-in capabilities. By "plug-in" it is meant that Netscape allows third party utilities and applications to be tightly integrated with the Netscape to enhance and expand its functionality. However, other web browsers having similar capabilities can also be used.

Therefore, process 108 will be described in terms of commercially-available Netscape Navigator software that provides an interface to the Internet via the Internet server 28 and a "plug-in" of the present invention which expands and enhances the capabilities of the Netscape software. It should be noted that the entire process 108 preferably takes place within the Internet Interface Computer 26, i.e. Netscape and the plug-in are preferably running on the computer 26. The operation and functionality of Netscape software is well-known to those skilled in the art. Also well-known is how to create plug-ins for the Netscape software.

Figure 8A:
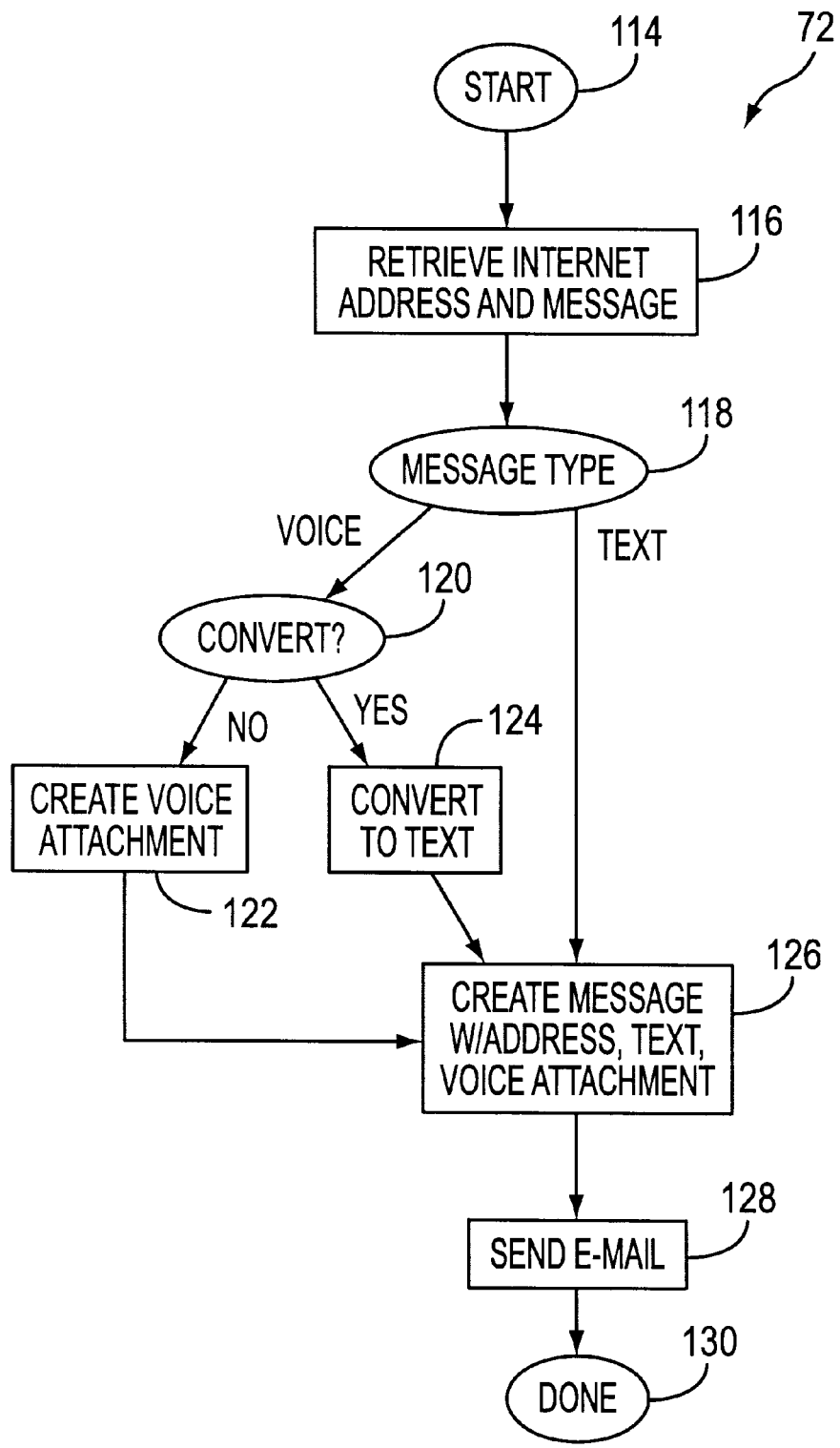
FIG. 8 is a flow-diagram of the "Send E-mail" step of FIG. 3.
Figure 8B:
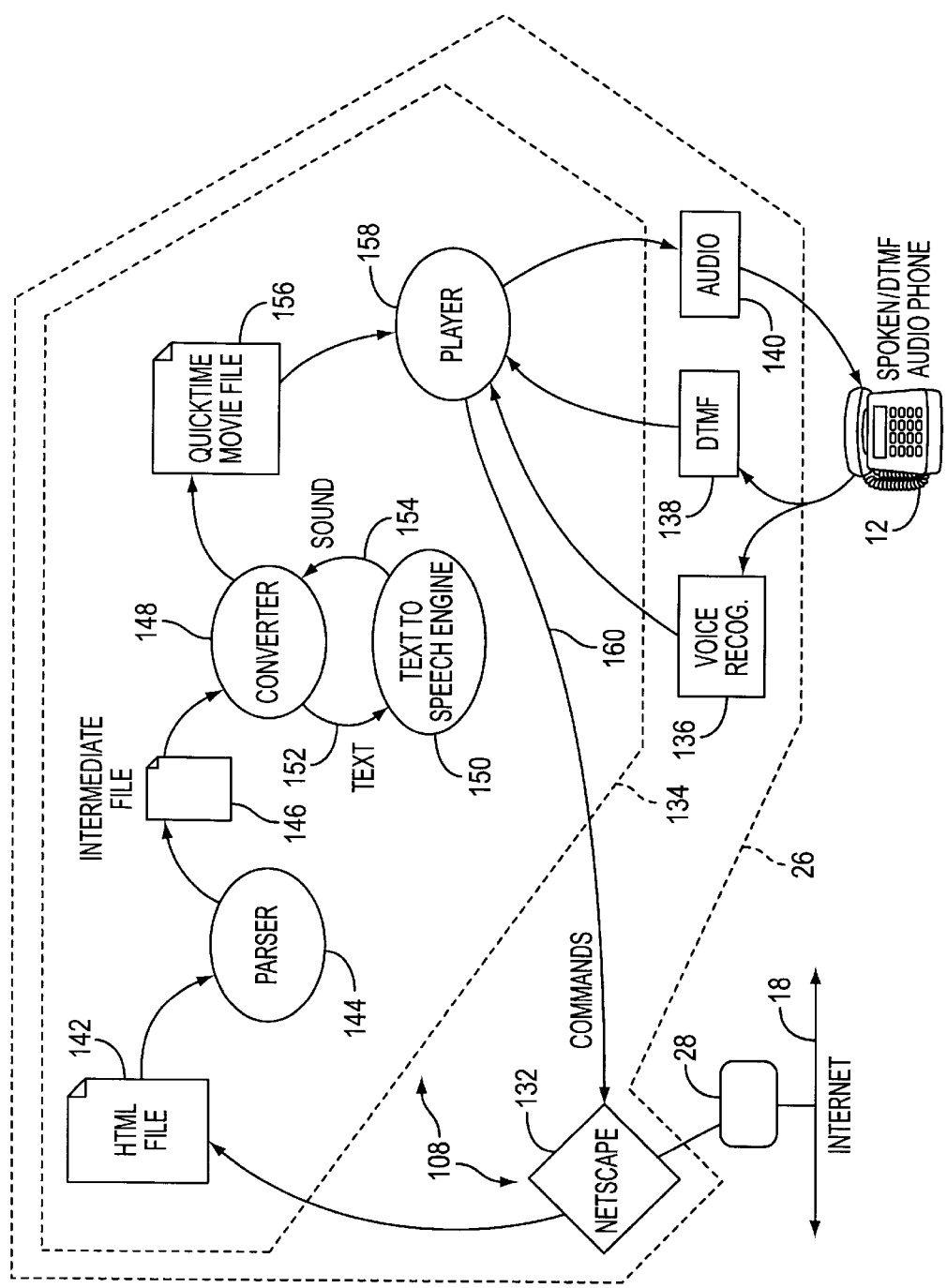
Figure 8C:
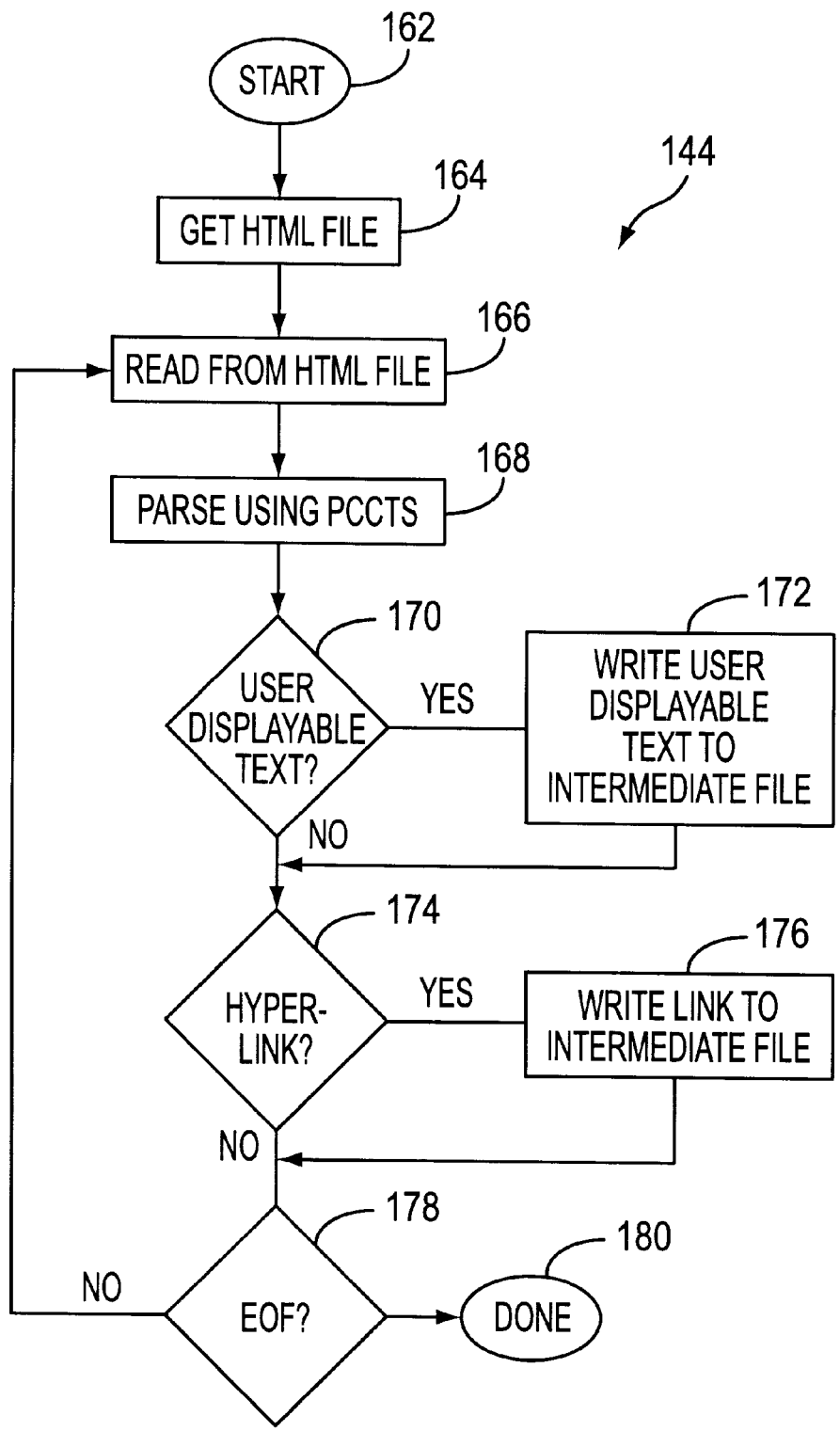

FIG. 8 is a flow-diagram illustrating step 72 of FIG. 3 in greater detail. The process 72 begins at 114 and, in a step 116, the Internet address and message is retrieved. A step 118 then determines the message type. The present invention accepts two types, namely "voice" and "text." If it is a voice message, a step 120 determines whether it should be converted to text. If not, a voice attachment is created in step 122. If the voice is to be converted, it is converted by a speech-to-text converter in a step 124. Again, speech-to-text converters (i.e. voice recognition systems) are commercially available. After the completion of steps 122 or 124, or if the message type is "text" as determined by step 118, the next step is 126 to create the message with address, text, and any voice attachment. The e-mail is then sent over the Internet in a step 128 and the process is completed at step 130.

As noted previously, the step 73 allows a telephone user to retrieve voice mail and/or e-mail. It will be appreciated that, as a first step, the step 73 will preferably verify the identity of a telephone user (typically using an account and keyword) to ensure that the telephone user should be allowed to access the mail. Then, if the mail is voice mail it is simply "played" to the telephone user, preferably utilizing a menu of (DTMF) commands implemented with the telephone keypad, as will be appreciated by those skilled in the art. If the mail is e-mail, it is "read" to the telephone user utilizing a text-to-speech system, and again preferably utilizing a menu of commands implemented with the telephone keypad. Therefore, the computer implemented e-mail retrieval method includes: calling from a user telephone to an access computer coupled to a TCP/IP network; providing user identification to said access computer; retrieving e-mail via said access computer that was sent over said TCP/IP network and addressed to said user; and reading said e-mail to said user of said user telephone utilizing a text-to-speech system. Preferably the method further includes providing at least one command to the access computer via a DTMF signal developed by the user telephone.

In FIG. 8a, the step 108 of FIG. 7 "Activate Netscape With Plug-In" is described in greater detail. It should be noted at this point that Netscape is a convenient platform for this process 108 since it is currently the most popular Internet "browser" and because it has powerful plug-in capabilities. By "plug-in" it is meant that Netscape allows third party utilities and applications to be tightly integrated with the Netscape to enhance and expand its functionality. However, other web browsers having similar capabilities can also be used.

Therefore, process 108 will be described in terms of commercially-available Netscape Navigator software 132 that provides an interface to the Internet 18 via the Internet server 28 and a "Plug-in" 134 of the present invention which expands and enhances the capabilities of the Netscape software 132. It should be noted that the entire process 108 preferably takes place within the Internet Interface Computer 26, i.e. Netscape 132 and the plug-in 134 are preferably running on the computer 26. Also provided by a combination of hardware and software functionality on the Internet Interface Computer 26 is a voice recognition interface 136, DTMF decoding interface 138, and audio output interface 140, all of which provide interfaces between the telephone 12 and the plug-in 134, and all of which are readily commercially available.

The operation and functionality of Netscape software 132 is well-known to those skilled in the art. Also well-known is how to create plug-ins for the Netscape software. The plug-in 134 of the present invention receives a hypertext mark-up language (HTML) file 142 from Netscape 132 as part of the normal functioning of Netscape 132. A parser 144 parses the HTML file into an intermediate file 146 which is input into a converter 148. The converter uses a text-to-speech engine 150 to convert text from the intermediate file into sound, i.e. the converter 148 passes text as indicated at 152 to the text-to-speech engine 150 and receives in return, corresponding sound as indicated at 154. As noted previously, text-to-speech engines are commercially available. The converter 148 then creates a "QuickTime Movie File" 146 which, as will be explained in greater detail subsequently, provides a convenient way for linking an audio track to hypertext links. It should be noted here that the QuickTime Movie File is an example of an audiovisual and linked hypertext engine, and that there are other commercially available engines to perform a similar function. The QuickTime Movie File 156 is then input into a player 158 which can provide audio (i.e. voice and other audio output) to the user of telephone 12 via the audio interface 140. Also, the player 158 responds to DTMF tones created by the telephone 12 and detected by the DTMF interface 138 of computer 26, and may also be responsive to the spoken word of the user into the telephone 12 via voice recognition interface 136 of the computer 26. The player 158 sends appropriate commands to Netscape 132 as indicated by arrow 160.

In use, the Netscape 132 is used to make a connection to the Internet 18 via the Internet Server 28. When an HTML file is received by the Netscape 132 over the Internet, it is passed to the plug-in 134 as HTML file 142, where it is parsed by parser 144 into the intermediate file 146. The converter 148 converts text to speech and stores it in a convenient format such as a QuickTime Movie File 158. The player 158 then plays the converted HTML file as a spoken message to a user of a telephone 12 via audio interface 140. Concurrently, the player 158 is responsive to inputs and commands from the user of telephone 12 via DTMF interface 138 and/or voice recognition interface 136. If a valid command or input is received by the player 158, the player 158 will put the command or input in a proper format and send it to Netscape 132. Netscape 132 will then act upon the commands and input accordingly.

In FIG. 8b, the process of parser 144 of FIG. 9 will be described in greater detail. Process 144 begins at 162 and, in a step 164, the HTML file 142 is retrieved. Next, in a step 166, the parser process 144 reads from the HTML file and, in a step 168, parses the HTML file text using a Perdue Compiler Construction Tool Set (PCCTS) or Yet Another Compiler Compiler (YACC). Both PCCTS and YACC are commercially available. Next, in a step 170, it is determined whether the results of the parsing is "user displayable" text. For example, the parsing of step 168 might find some "user displayable" text intermixed with graphics, photographs, Java Applets, etc. which, in the present preferred embodiment, would not be considered user displayable text. If step 170 determines that there is user displayable text, a step 172 "writes" the user displayable text to the intermediate file 146. If step 170 determines that it is not user displayable text, or after step 172 has been completed, a step 174 determines if there is a hyperlink embedded in the HTML file 142. If there is a hyperlink, it is written to intermediate file 146. If step 174 determines there is no hyperlink, or after the completion of step 176 if there is a hyperlink, a decision step 178 determines if an end of file (EOF) has been read from the HTML file 142. If not, process control is returned to step 166 to continue reading the HTML file. If step does 178 does detect the EOF of the HTML file 142, the process 144 is completed as indicated at 180.

Figure 9A:
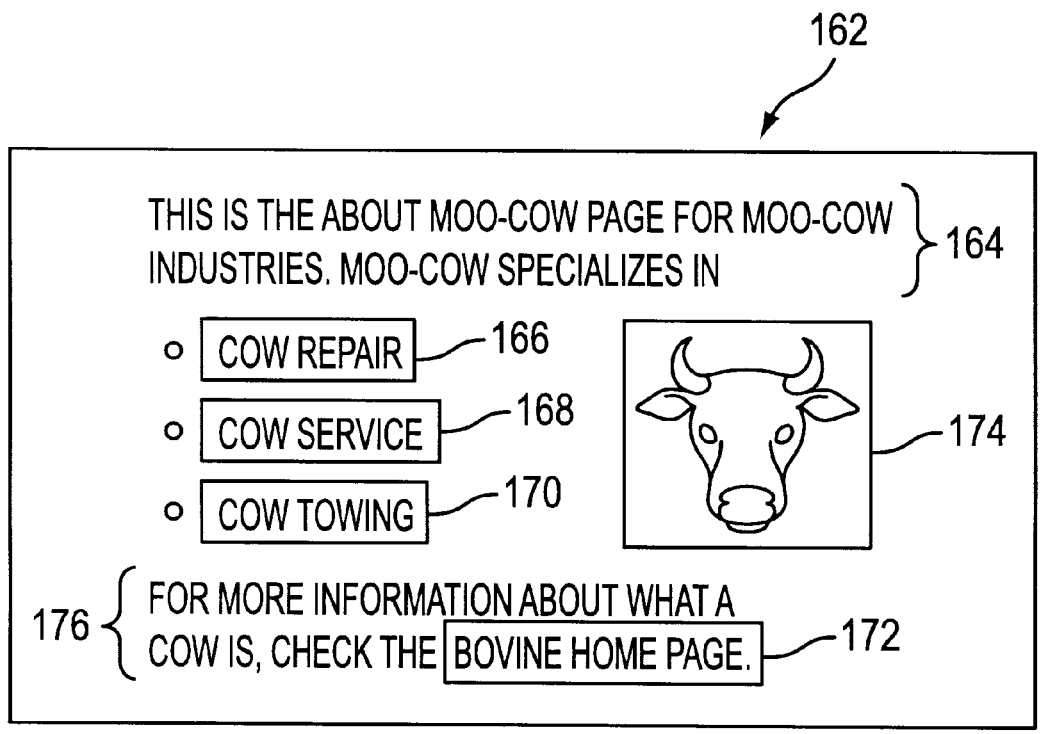
FIG. 9 is a representation of a web page in accordance with the present invention.

The parsing process 144 will be explained by way of example with FIGS. 9 and 9a. FIG. 9 is a visual representation of a web page 162 from "Moo-Cow Industries" that was linked to the home page 92 of FIG. 6a. More particularly, the hyperlink 98 of home page 92 (see FIG. 6A) was used to access the "about moo-cow" page 162. If a user is using a personal computer, they would see the visual representation of the web page as shown. However, since a preferred interface for accessing this web page 162 is the telephone 12, the web page 162 must be translated in such instances, and to the extent possible, into audio information, if a telephone is being used to access the page.

The web page 162 includes first text 164, hyperlinks 166, 168, 170, and 172, a graphic 174, and additional text 176. In the present preferred embodiment, the system does not recognize graphics, photographs, and other types of non-text objects, such as the graphic 174. However, in an alternate embodiment of the present invention, the system can recognize at least types of non-objects. For example, the system can recognize a non-text object as a "graphic," a "photograph," a "graph," a "Sava Applet," etc. and provide a text-like description in its parsing of that non-text object. An even more sophisticated embodiment of the present invention can provide Neural Network and other techniques to make an identification of the non-text object such as by providing the text string "there is a graphical representation of a cow."

FIG. 9a illustrates the intermediate file 146 of FIG. 8a that has been created from the HTML file 142 by the parser 144.

As noted in FIG. 9a, the text 164 has been parsed as text, the hyperlinks 166–170 have been parsed into hyperlinks and text 178, text 176 has been parsed as text, and the hyperlink 172 has been parsed as hyperlink and text 180. Unrecognized objects, such as non-text object 74, is not added to the intermediate file 146. Intermediate file 146 is then ready for conversion from text-to-speech by converter 148

Figure 10:
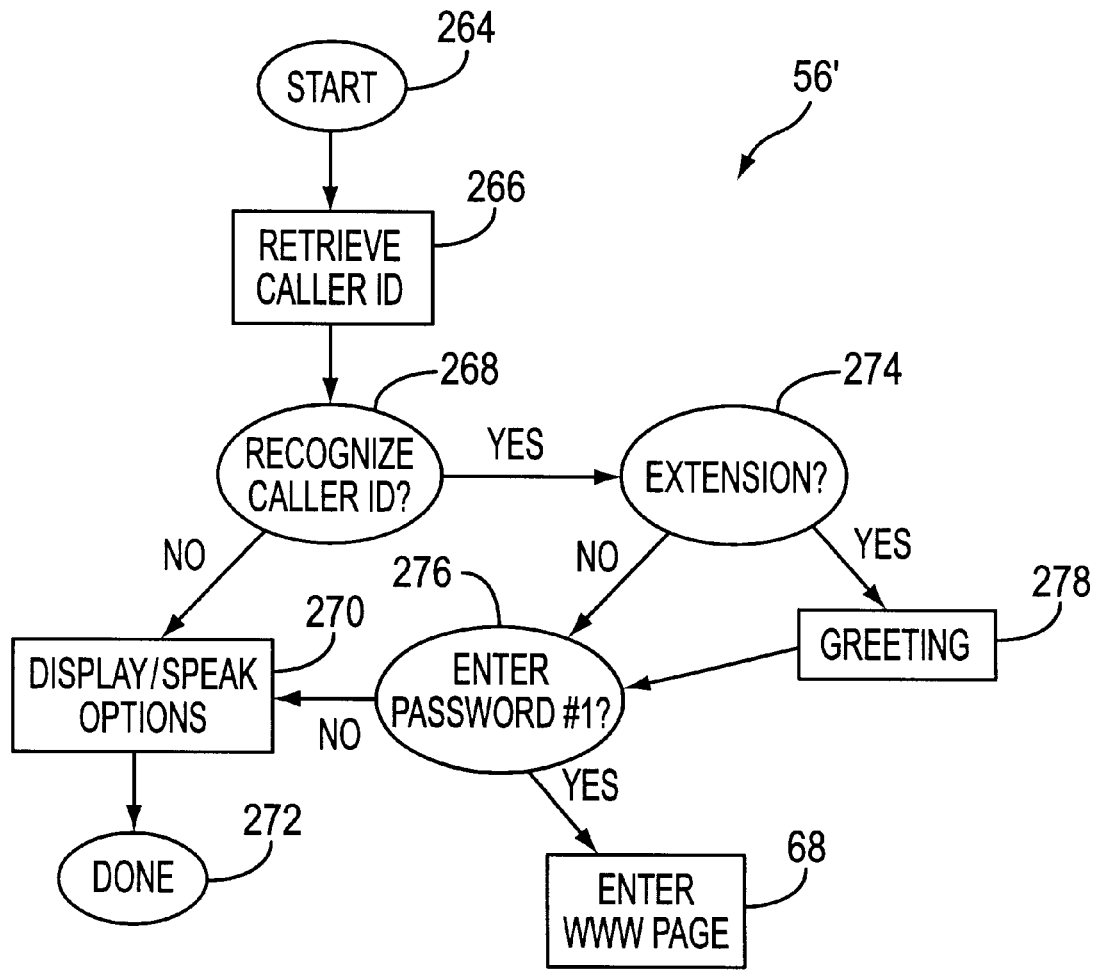
FIG. 10 is a flow-diagram illustrating an alternate embodiment 56' for the "DISPLAY/SPEAK OPTIONS" step 56 of FIG. 3.

In FIG. 10, an embodiment 56' for the step 56 of FIG. 3 is illustrated in flow-diagram form. More particularly, the process 56' begins at 264 and, in a step 266, the telephone caller's "caller-ID" is retrieved. This caller-ID can be determined in several ways. Preferably, the caller-ID is automatically provided by the local telephone system. A great many regional telephone systems automatically provide a caller-ID (i.e. the telephone number) of a caller to the recipient of the call. Alternatively, if the caller-ID is not automatically provided by the telephone system, the user can be prompted to enter their caller-ID. Again, preferably, this will be the user's telephone number. If multiple users use a single telephone number, an "extension" can be provided to specify which individual is calling from that telephone number. For example, the caller-ID "415-555-1234-33" can be used to indicate that the caller is user #33 of the telephone number "1-415-555-1234." Of course, other forms of caller-ID (such as an arbitrary user number) can be used alternatively or additionally.

Next, in a step 268, it is determined whether the caller-ID is recognized. This is determined, for example, by looking up the caller-ID in a database accessed by the Internet Interface Computer 26. Preferably, this database is stored, for example, in disk storage 44 of computer 26. By "recognize" it is meant herein that there is record associated with that caller-ID in the database. Other information in the record can include the passwords, name, address, billing information, etc. of the user. If the caller-ID is not recognized by step 268, a step 270 is initiated where the options are displayed and/or spoken to the user. The process is then completed at 272, and step 58 of FIG. 3 is entered to await a response from the user.

If the caller-ID is recognized by step 268, it is first determined if there is an extension associated with the caller-ID. If so, a greeting can be provided in step 278. For example, if extension "33" of the telephone number "1-415-555-1234" belongs to "Bob Smith", the greeting in step 278 can greet Bob Smith with the greeting "Good morning Bob. Good to hear from you! It has been 2 days since your last visit."

If there is no extension as determined by step 274, or after the greeting of 278, a step 276 prompts for and then detects the password of the user. A suitable prompt is "Please Enter Your Password To Enter Your World Wide Web Home Page." If the correct password is not detected, process control is turned over to step 270. If the proper password is determined, the user's WWW page is entered in step 68 (see FIG. 3).

As noted previously, a preferred business model sells advertising time on the voice browser so that "free" browser service can be provided to telephone users. To accomplish the interleaving of voice advertising with the browsing feature of the present invention, a process 280 (see FIG. 11) of the present invention is used. This process 280 runs concurrently with the network browser and may form a part of the plug-in of the browser.

Figure 11:
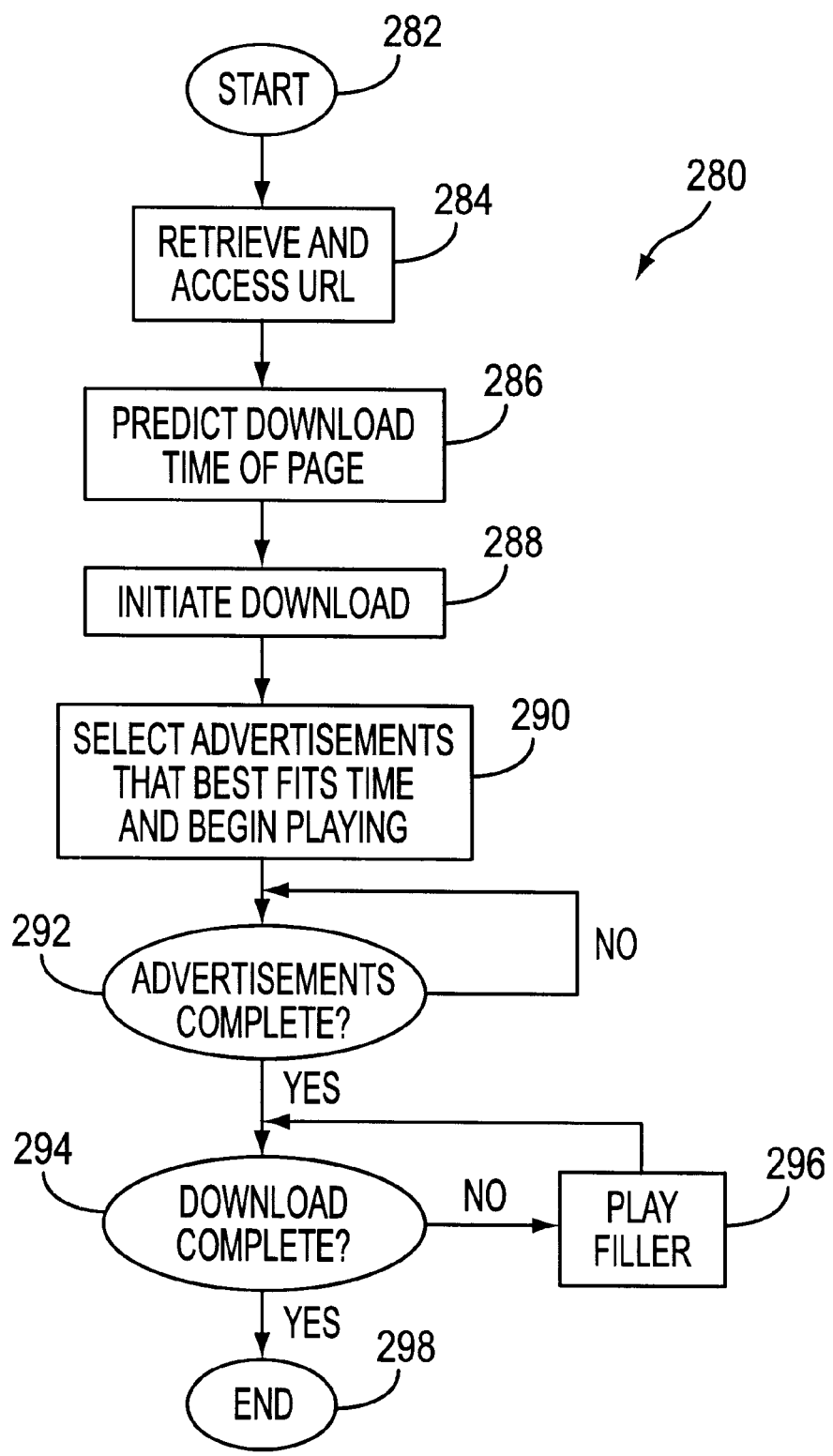
FIG. 11 is a flow-diagram of an advertisement player process of the present invention.

As seen in FIG. 11, the process 280 begins at 282 and, in a step 284, a URL is retrieved (e.g. from the telephone user) and then is used to access a web page on the WWW. Next, a step 286 predicts the download time of the page corresponding to that URL. This can be accomplished by first retrieving the size of the web page being downloaded, i.e. the number of bytes that comprises the HTML description of the web page. Netscape allows for such size information retrieval. For example, a web page with complex graphics or with large Java Applets will be larger and will take longer to download than a simple text web page. The download time can be predicted by using an "average download rate" (i.e. the average number of bytes/second downloaded by the computer) or by downloading a certain number of bytes from the web page, detecting the rate at which those bytes are received ("detected download rate"), and then calculating the remaining download time using the detected download rate.

It should be noted that the speed of downloading will be heavily dependent upon the operating characteristics of the web server hosting the desired web page, the current "traffic" load on the Internet, the number of nodes on the Internet over which the TCP/IP packets of the web page must traverse, etc. Therefore, the amount of time that the web page takes to download can vary depending on the time of day (e.g. prime time versus non-prime time), the size of the HTML file representing the web page, the transmission characteristics between the web server and the download computer, and a number of other Internet related factors.

After step 286 predicts the download time of the page, i.e. predicts an "advertising timeslot", the download is initiated in step 288. A step 290 then selects one or more advertisements that fits the advertising time slot and begins playing those one or more advertisements. For example, the Internet interface computer 26 preferably stores a number of voice advertisements of various lengths, e.g. 5 second, 10 second, 15 second, 20 second, etc. If it is determined in step 286 that it will take 30 seconds to download the WWW page, two 15 second advertisements, or a 20 second and a 10 second advertisement or three 10 second advertisements, or six 5 second advertisements can be played during the download time. Preferably, the selected advertisements are played in their entirety, although in an alternative embodiment of the present invention, the advertisement are "cut-off" once the web page is fully downloaded. However, as noted in FIG. 16, a step 292 preferably determines if the advertisements are complete and, if not, enters an event loop waiting for the completion of the advertisements being played.

Once the advertisements have been played, a step 294 determines if the download of the web page is complete. If not, an optional step 296 can play a "filler" such as music, more advertisements, an audio reminder such as "one moment please, downloading", etc. Once the download is completed as detected by step 294, the process 280 is completed at 298.

Figure 12:
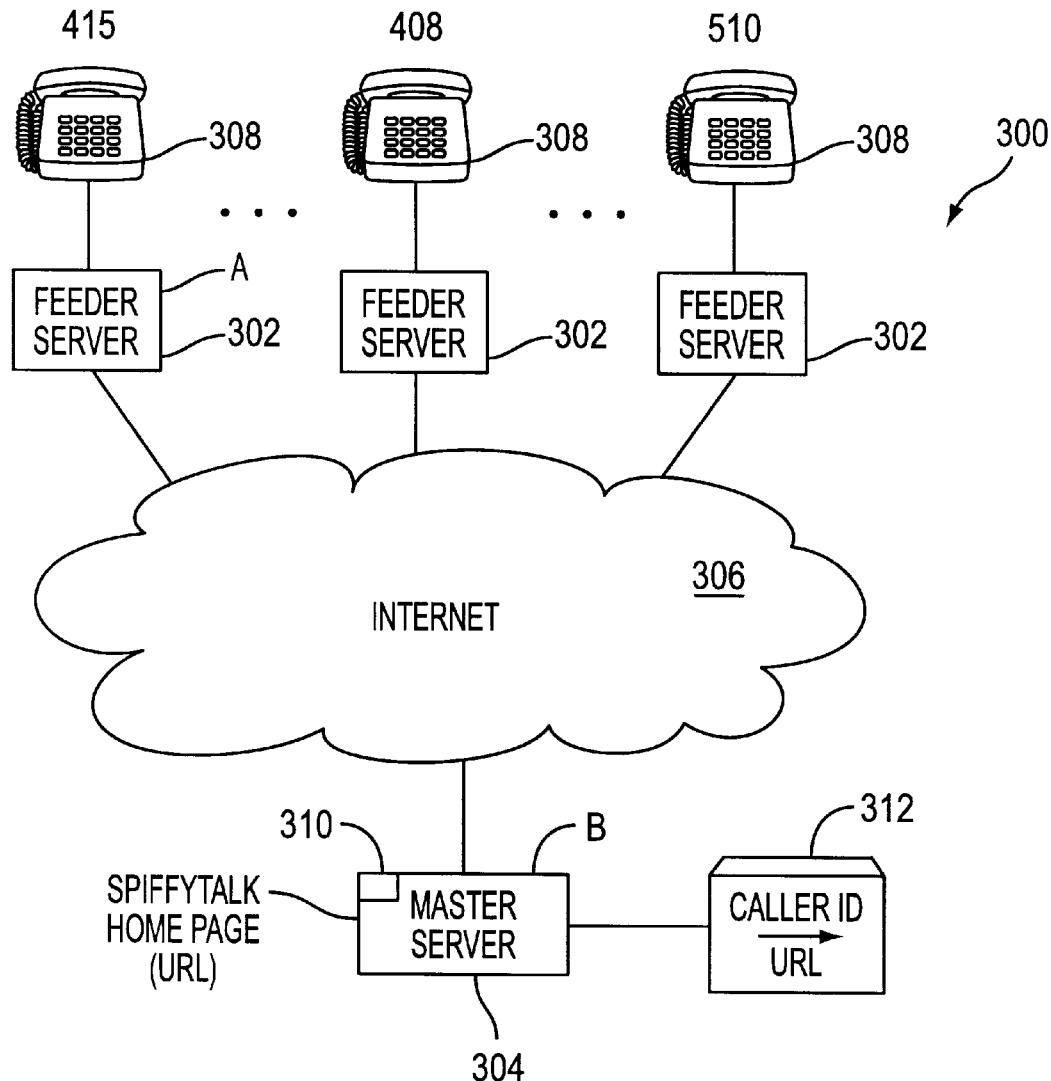
FIG. 12 is a conceptual diagram of a Feeder Server/Master Server system of the present invention.

In FIG. 12, an alternate preferred embodiment of a system 300 for providing access to a wide area network includes a number of "feeder servers" 302 and a "master server" 304 coupled to the Internet 306. Preferably, one or more feeder servers are provided each telephone area code (such as area codes "415," "408," "510," etc.), so that user of a telephone 308 incurs minimal toll-charges. Of course, any of the telephones 308 can call any of the feeder servers 302, but a larger toll call might be incurred. The feeder servers 302 then communicate with the master server 304 via the Internet 306.

The arrangement of system 300 reduces toll-charges for users of the telephones 308. Absent use of the feeder servers 302 of system 300, a telephone caller from a telephone 308 would call directly to the master server 304, resulting in possibly large toll-charges ("telephone charges"). The system 300 is therefore well adapted for business models where it is desirable to minimize the telephone charges incurred by the user. The system 300 is therefore well adapted for the business model where free Internet access is provided (i.e. the "advertising" model) and also for local 1-976 models where feeder servers must be located within each "976" operating area or region. On the other hand, a 1-800 model or a 1-900 dial-in business model does not need to rely on feeder servers 302 (although they could still be used), since the "800" and "900 " number permit country-wide access to the master server 304.

The master server 304 is the "host" or "home" of a master home page 310 of the service. For example, the "SpiffyTalk" home page 310 can be provided on the master server 304. In addition, a database 312 is connected to the master server 304 to store such things as a database of caller-IDs, URLs, customer information, etc.

Figure 13:
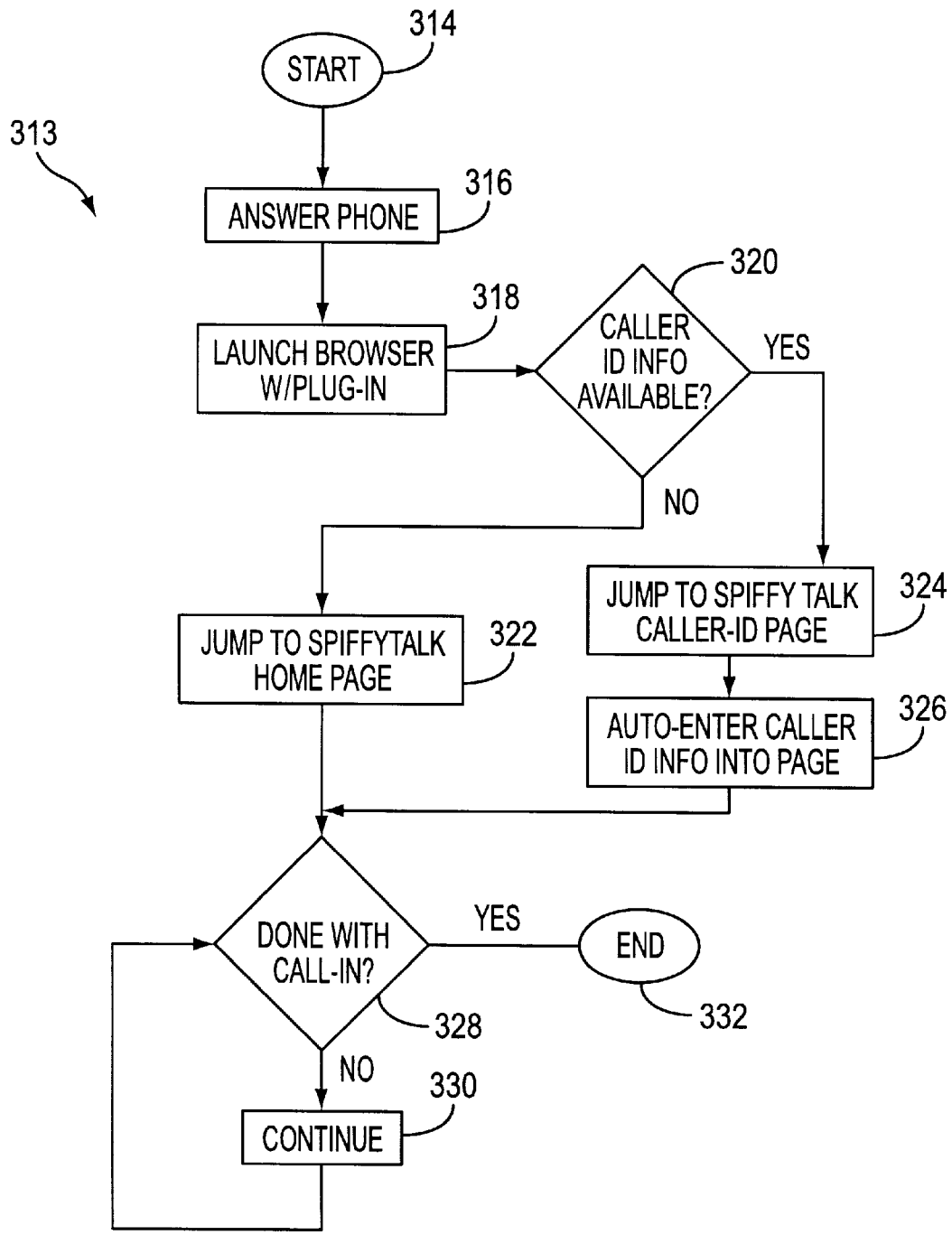
FIG. 13 is a flow-diagram of a server process running on the feeder server of FIG. 12.

FIG. 13 is a flow-diagram illustrating a process 313 running on a feeder server 302. More particularly, the process 313 begins at 314 and, in a step 316, the telephone is answered. The step 318 then "launches" or starts the browser with its plug-in. A step 320 determines if caller-ID information is available. If not, the process 313 then "jumps" to the SpiffyTalk home page in a step 322.

If caller-ID information is available, step 320 turns over process control to step 324 which causes a "jump38 to the SpiffyTalk caller-ID page. By "jump" it is meant herein that the proper URL is given to the Netscape browser 132 of FIG. 9 to cause the loading of the designated web page. Next, a step 326 automatically enters the caller-ID information into the caller-ID web page. This caller-ID information is derived, for example, from the telephone system, the user, the database 312 of FIG. 17, etc. After the completion of either steps 322 or 326, a decision step 328 determines whether the telephone call is completed. If not, the Internet access continues as indicated at step 330. When the call is determined to be completed, e.g. by the detection of a hang-up signal from the telephone or due to an explicit command from the telephone user the process 313 is competed as indicated at 322.

Figure 14A:
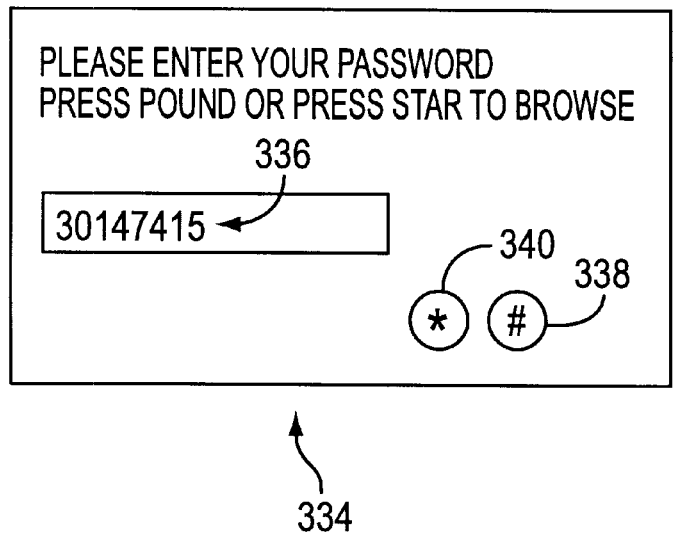
FIGS. 14a and 14b illustrate a process in accordance with the "JUMP TO SPIFFYTALK HOME PAGE" step of FIG. 13.
Figure 14B:
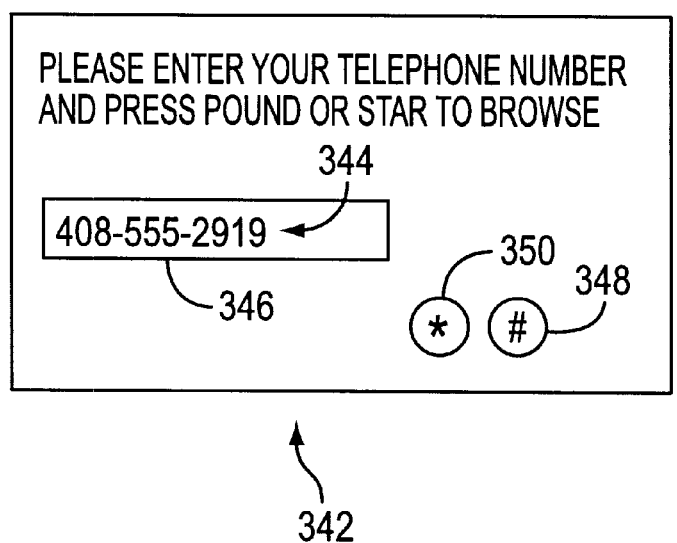
Figure 18:
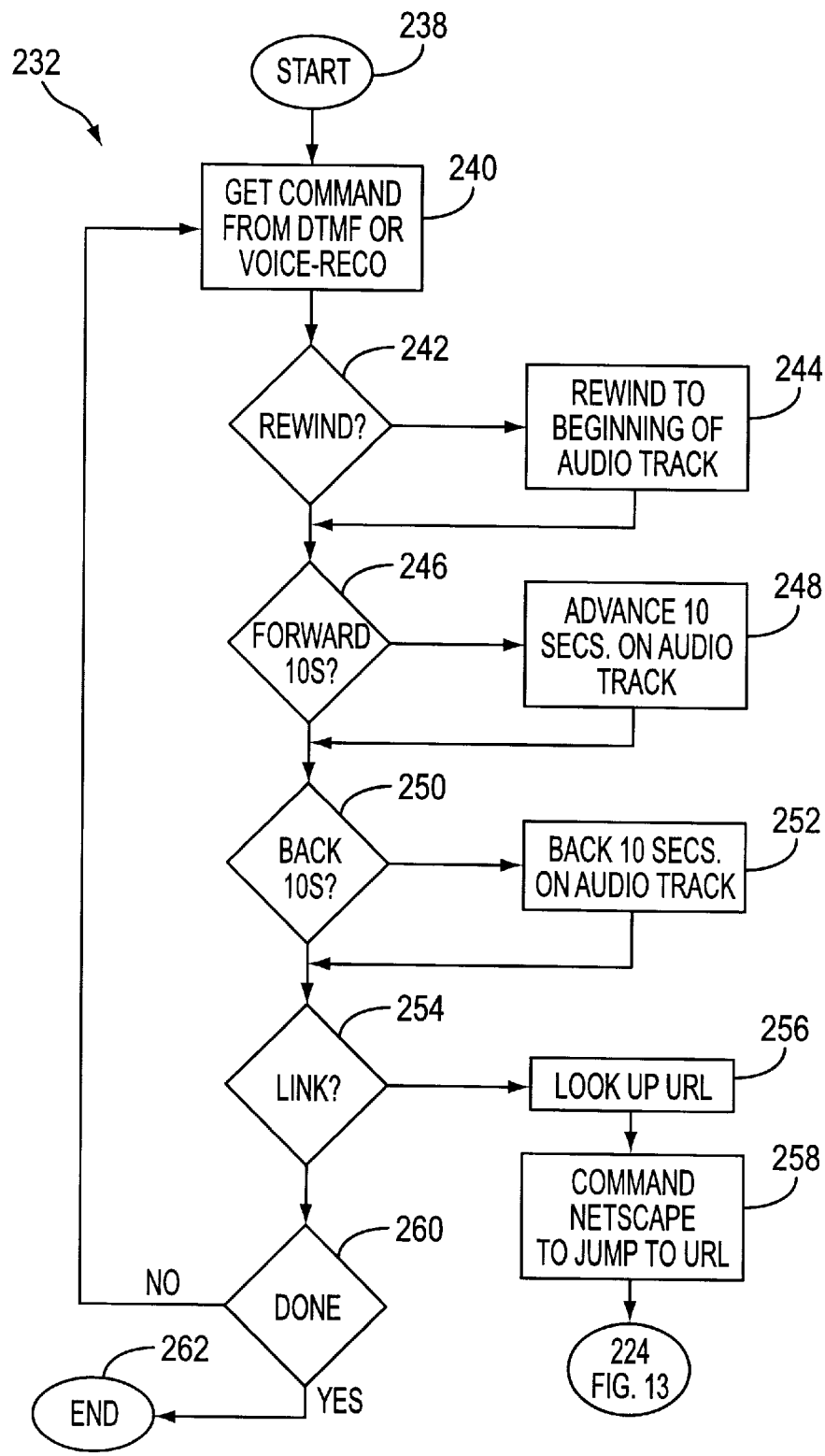
FIG. 18 illustrates the operation "Process User Command" of FIG. 17 in greater detail.

FIGS. 14a and 14b illustrate a sequence of "screens" or web pages initiated by the step 322 "Jump To SpiffyTalk Home Page" of FIG. 18. In FIG. 14a, the telephone user is instructed to enter their password and press the "#" key or to press the "*" key to browse the Internet. In other words, the page 334 of FIG. 14a assumes that "free" Internet browsing will be provided as a "first-tier" of service, meaning that no password is required. However, if the user wishes to access more features of the Internet (i.e. use a second-tier of service) by paying a subscription fee, a password 336 can be provided.

If the user is calling in from a telephone, the password 336 is provided by pressing the appropriate numeric keys on the telephone to enter the password 336, and then pressing the "#" key on the telephone. If, however, the page 334 is accessed by a computer coupled to the Internet, the page 334 is displayed on the computer screen and the password 336 can be entered with the keyboard of the computer. The user of a computer coupled to the Internet can press the number ("#") key 338 or the star ("*") key 340 by using a pointing mechanism, such as a mouse. With reference to FIG. 14b, once the system has determined that a proper password has been entered into the system, a page 342 requests that the telephone number, followed by the "#" key, be entered, or that the "*" key be pressed to browse. Again, if a telephone is being used, the instruction "Please Enter Your Telephone Number And Press The Number Key Or Simply Press The Star Key To Browse" or the like can be read over the telephone system, and the telephone number 344 is preferably entered on the keypad of the telephone. After the telephone number has been entered, the "#" is pressed on the telephone. If, however, a computer system provided with a Internet browser is used to access the page 342, the page can appear as shown with a box 346 for the entry of the telephone number 344. A pointer mechanism, such as a mouse, can then be used to select the number (#") key 348 or the star ("*")key 350.

Figure 15:
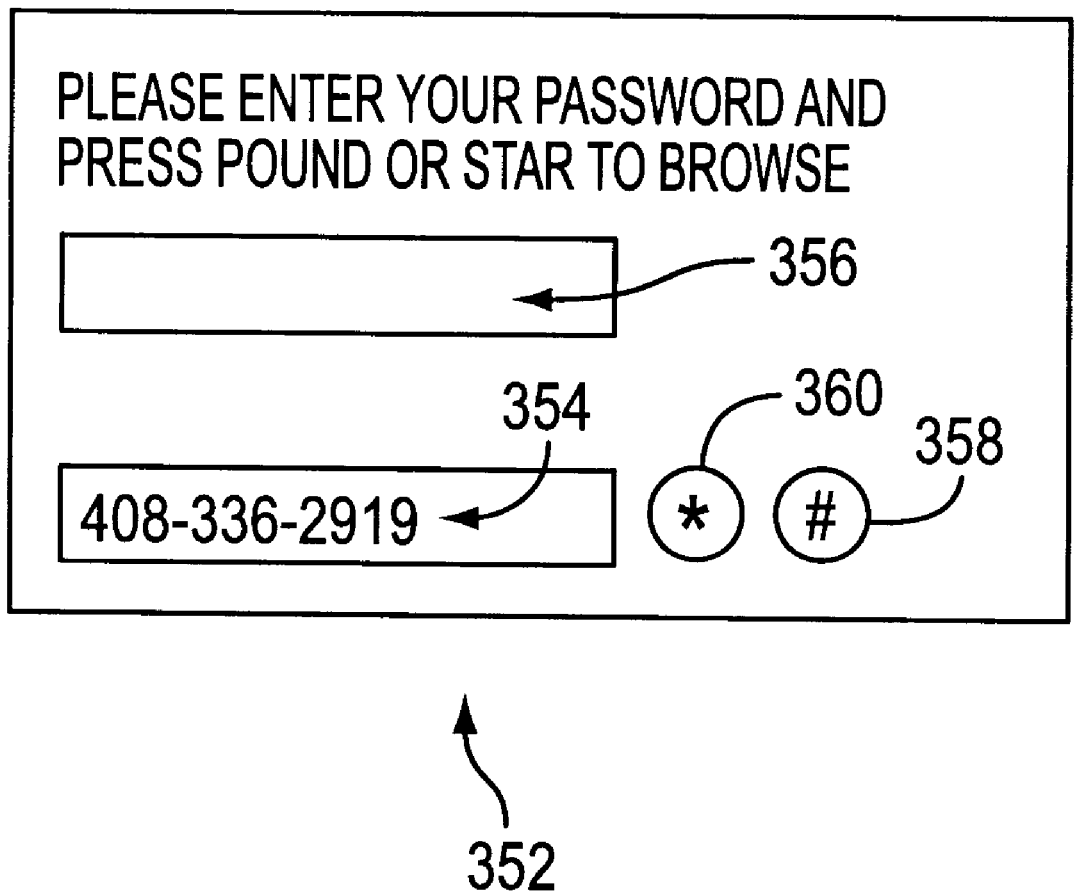
FIG. 15 illustrates a process in accordance with the "JUMP TO SPIFFYTALK CALLER ID PAGE" step of FIG. 13.

FIG. 15 illustrates a web page 352 as accessed by step 324 of FIG. 13. In this instance, the caller-ID is known as determined by step 320 of FIG. 13. The caller-ID 354 (e.g. the telephone number) is automatically entered into the web page 352. Therefore, in this instance, only the password needs to be entered into the "box" 356. If the user is calling in from a telephone, the web page 352 can prompt "Please Enter Your Password And Press The Number Key Or Simply Press The Star Key To Browse" (or the like — see FIG. 15) and the user will key in their password followed by the "#" sign. If the web page 352 is being accessed from a computer system using an Internet browser, the web page 352 will be shown and the keyword can be typed into the box 356. The computer user can then select the pound ("#")key 358 or the star ("*") key 360 by utilizing a suitable pointer mechanism.

Figure 16:
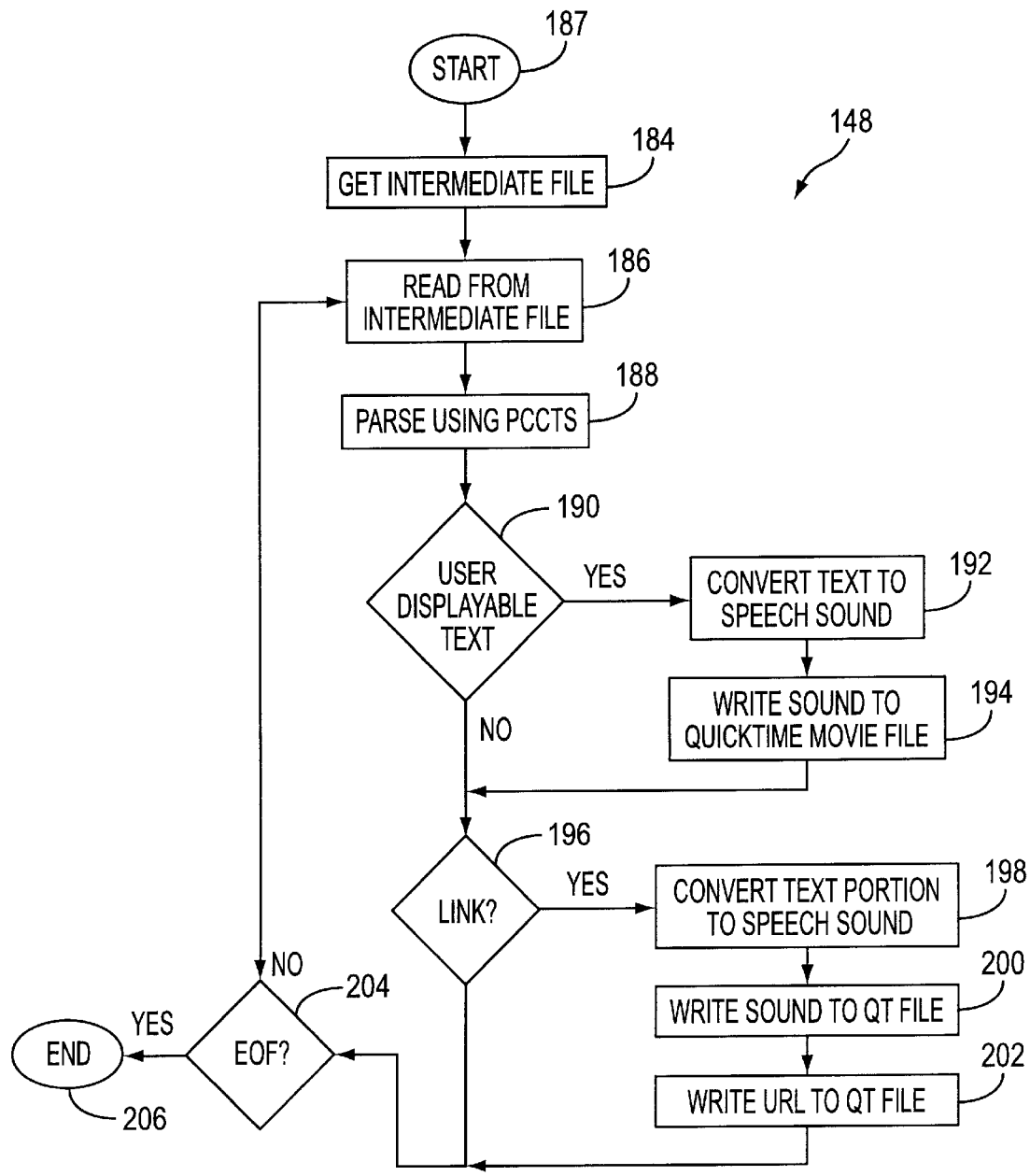

In FIG. 16, the method of converter 148 is illustrated. The method 148 begins at 142, and in a step 184, the intermediate file 146 is retrieved. Next, in a step 186, a segment of the intermediate file is read. This portion of the intermediate file is parsed again, preferably, using PCCTS in a step 188 and, in a step 190, it is determined whether there is user displayable text. If there is user displayable text, a step 192 converts text to speech and other sounds. For example, special sounds such as "siren " could be converted either to the sound of the siren or to the spoken word "siren." .If a word was to be converted into a sound, rather into a spoken word, a special identifier such as <sound > can be used as a preference tend to be used as an indicator. For example, "<sound>siren" would make the siren sound, while "sound " alone would be read as "sound." Next, in a step 194, the sound is written to a QuickTime Movie File or the like.

If step 190 determines that user displayable text is not present, or after the completion of step 194, a decision step 196 determines whether there is a hyperlink. If yes, a step 198 coverts the text portion to speech sound, the sound is written to a quick time file in a step 200, and the URL is written to the QuickTime Movie File in a step 202. If step 196 determines that there is not a hyperlink, or after the completion in step 202, a decision step 204 determines whether an end of file (EOF) has been found in the intermediate file 146. If not, process control is returned to step 186. If an EOF has been found, the process is completed as indicated at 206.

Figure 16A:
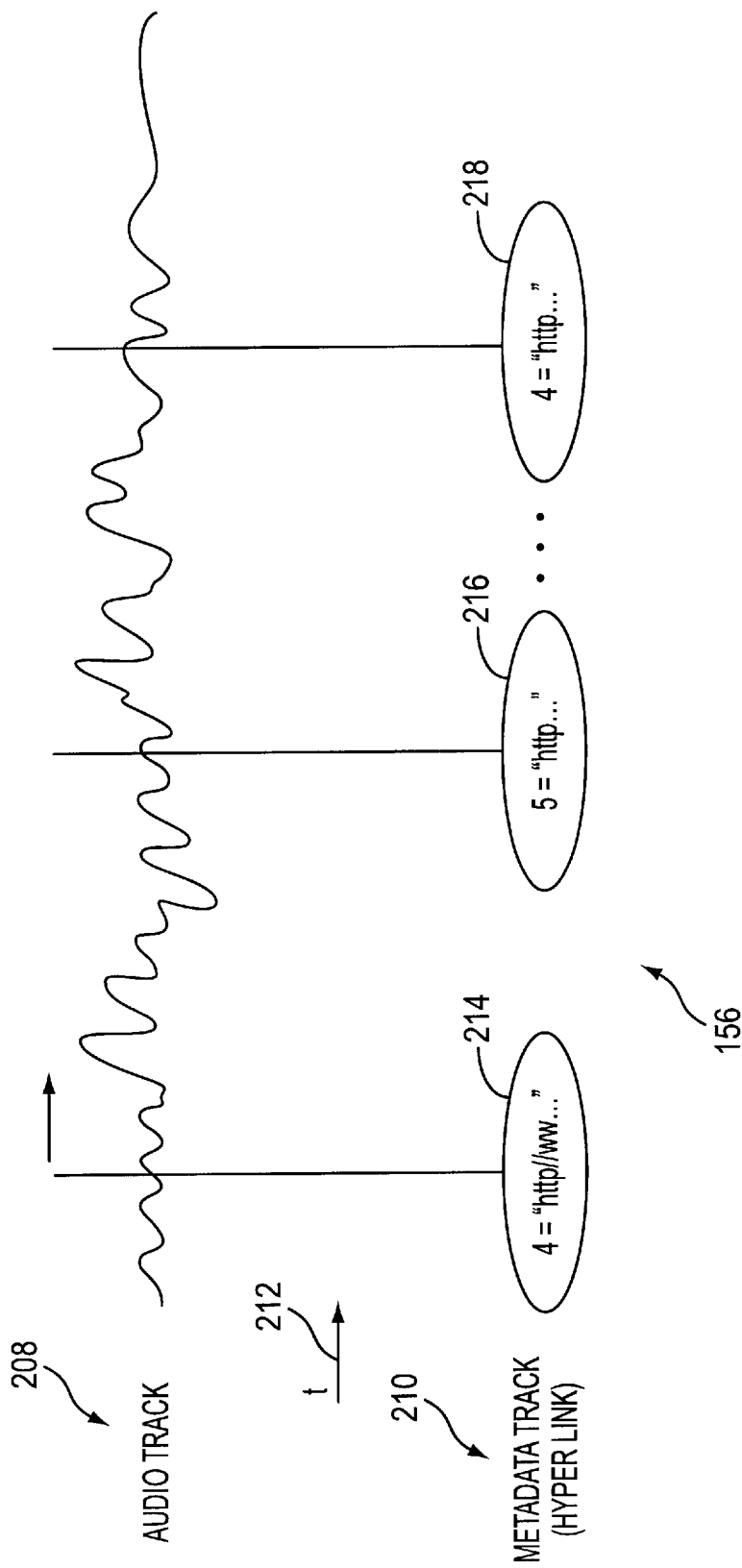
FIG. 16a illustrates a QuickTime movie file according to an embodiment of the present invention.

In FIG. 16a, a QuickTime Movie File 156 is illustrated. As noted previously, there are alternatives for QuickTime Movie File which provide similar functionality. The QuickTime Movie format operates on Macintosh platforms, and there are equivalent utilities available for other platforms such as "WINTEL" platforms running Intel-type microprocessors and Microsoft Windows operating system software. In the illustration of FIG. 16a,the QuickTime Movie File includes an audio track 208 and a "metadata" track 210. Time increases from left to right in this illustration as indicated by arrow 212. At irregular intervals, the audio track is linked to a hyperlink in the metadata track 210, such as with hyperlinks 214, 216, and 218. These hyperlinks were written by step 202 of FIG. 16. Each hyperlink 214–218 is given a reference number and a URL. For the purpose of this illustration, the entire URL has not been written. Also, it should be noted that the reference number can be reassigned, such as with hyperlink 218 having the reference number 4 which was reassigned from hyperlink 214. Reassignment is needed because there are many more possible hyperlinks than telephone keypad keys. This QuickTime Movie File 156 therefore provides a convenient method for linking an audio track with a metadata track including a number of hyperlinks. The use and functionality of QuickTime Movie File are described in greater detail in the multi volume set Inside Macintosh, Addison-Wesley Publishing Company, Inc.

Figure 17:
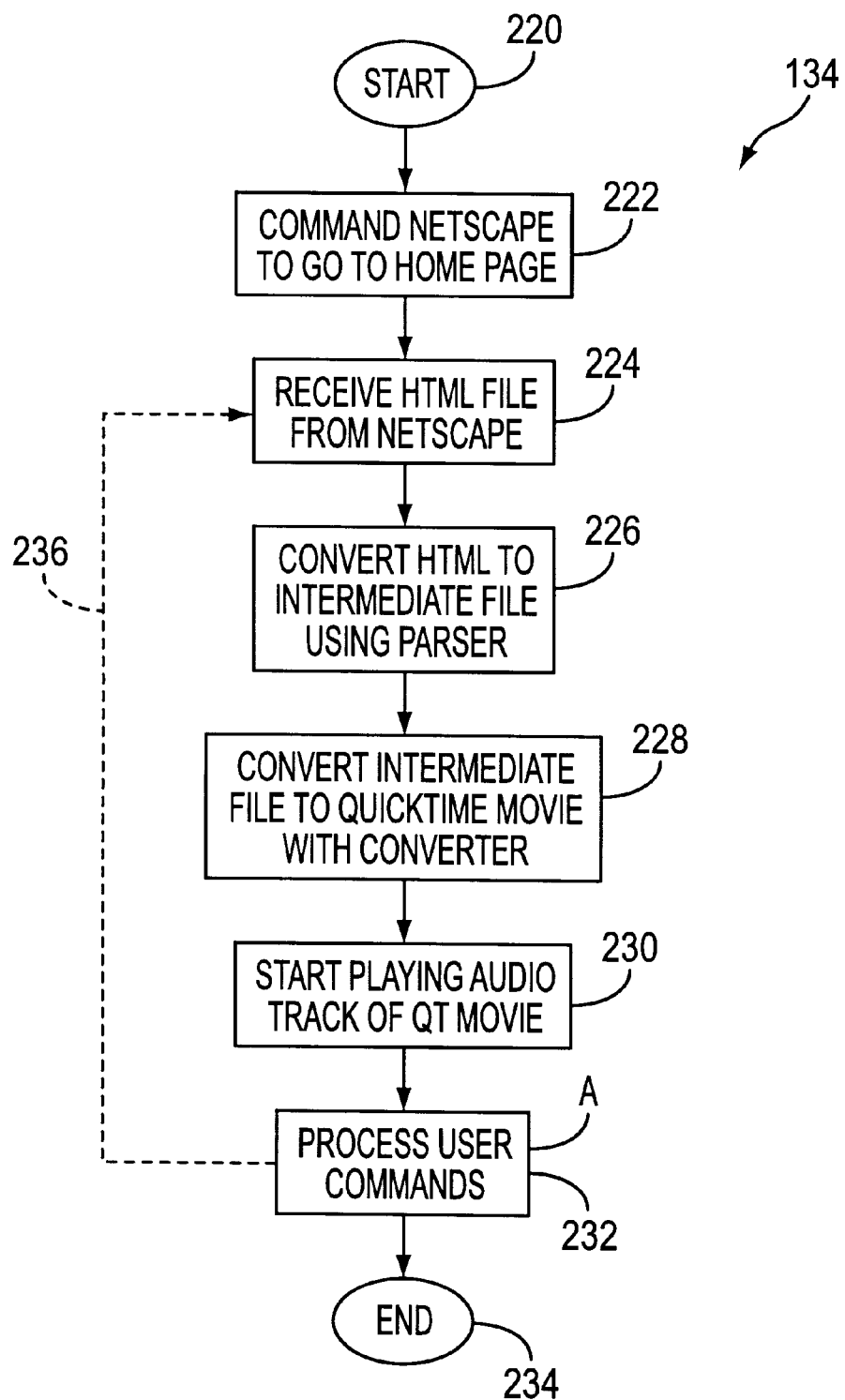

In FIG. 17, the process of the plug-in 134, under the control of the player 158, will be described. The process of 134 begins at 220 and, in a step 222, the player 158 commands Netscape to go to the desired home page, i.e. the starting home page. Next, in a step 224, the HTML file 142 is received from Netscape 132 and, in a step 226, the parser 144 converts the HTML file 142 to the intermediate file 146. Step 228 converts intermediate file to a QuickTime Movie File 156 with the converter 148, and the player 158 starts playing the audio track of the QuickTime Movie File in a step 230. The player 158 also processes user commands retrieved through DTW interface 138 or voice recognition interface 136 in a step 232, and the process for that HTML file is completed at 234. Alternatively, as indicated at 236, an additional HTML file can be retrieved from Netscape in a step 224 and the process can be repeated for this new HTML file.

In FIG. 18, the step 232 of FIG. 17 "Process User Command" is shown in greater detail. The process 232 begins at 238 and, in a step 240, a command from the DTMF interface 138 or the voice recognition interface 136 is received. If the command is "Rewind" as determined by a step 242, QuickTime Movie Fide 156 is "rewound" to the beginning of the audio track in a step 244. If the command is "Forward 10 Seconds" as indicated by step 246, the audio track on the QuickTime Movie File 156 is advanced by 10 seconds. If the command is to "Go Back 10 Seconds" as detected by step 250, the audio track is "rewound" 10 seconds on the QuickTime Movie File 156. If a step 154 indicated that the user wishes to jump to a hyperlink, the URL is looked up in a step 256 and a command is created in a step 258 for Netscape 132 to jump to the appropriate URL. Process control is then returned to step 224 of FIG. 17 to receive a new HTML file from Netscape. If step 260 determines that the user is done (for example by receiving a "done " command from the user or by sensing that the user has hung-up the telephone), the process is completed as indicated at 262. If the telephone user is not done, process control is returned to step 240 to retrieve a new command from the user of telephone 12.

Figure 19:
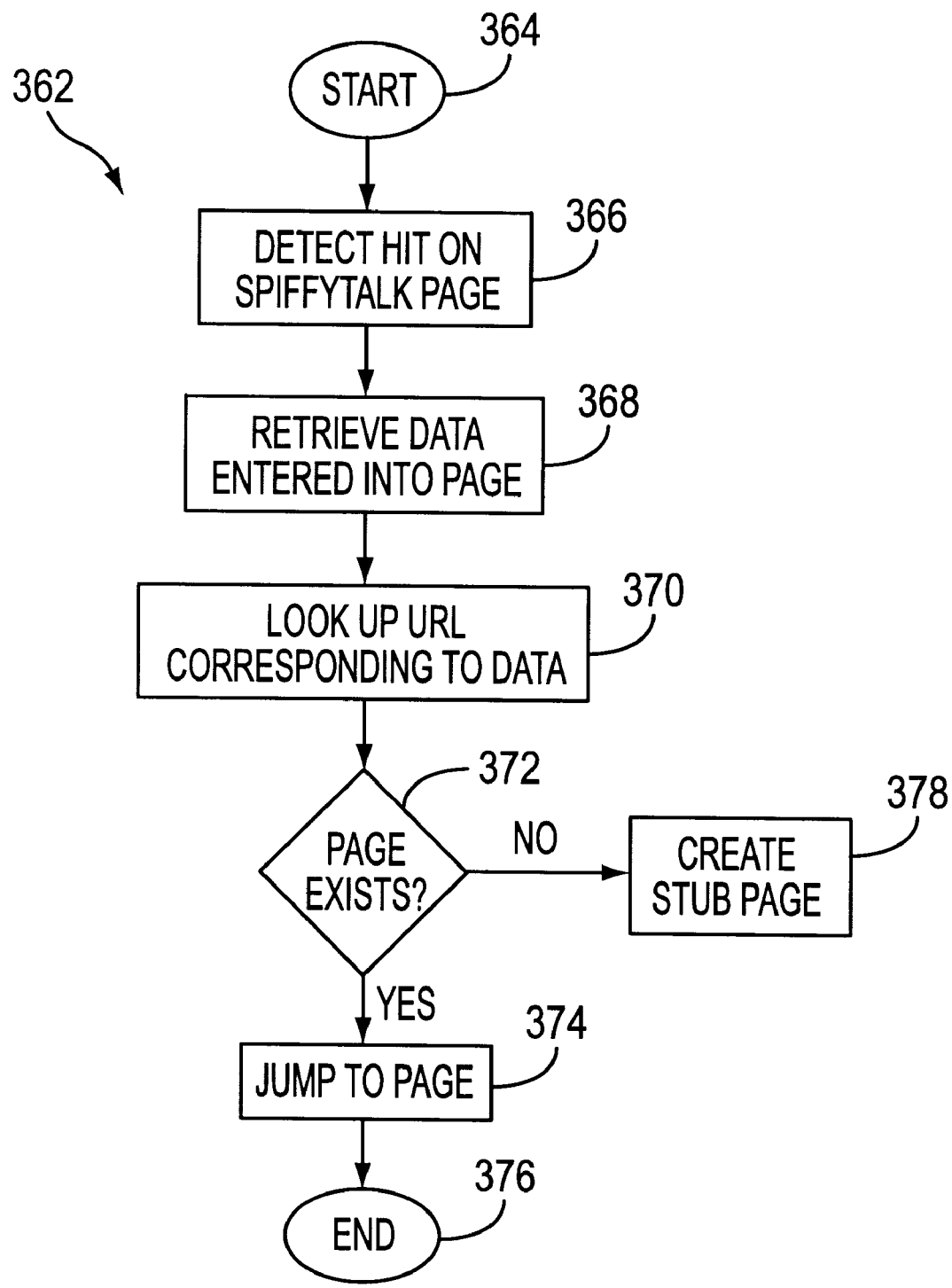
FIG. 19 illustrates a process running on the master server of FIG. 12.

FIG. 19 illustrates a process 362 running on the master server 304 of FIG. 12. The process 362 begins at 374 and, in a step 366, a "hit", on the SpiffyTalk home page 310 (see FIG. 12) is detected. By "hit", it is meant herein that the system detects that a web page within its domain is being addressed by an incoming URL. Next, a step 368 retrieves the data entered into the home page. This retrieval of data was discussed with reference to FIGS. 14a, 14b, and 15. Next, a step 370 "looks up" the appropriate URL corresponding to the data. This URL and corresponding data is preferably stored in database 312. Next, a step 372 determines if a page for the URL exists. If so, Netscape is instructed to "jump" to the page designated by the URL in a step 374 and the process is complete at 376. If a web page for that URL does not exist, a "stub" page is created by the process 362 of the present invention. A "stub" page is simply a subsidiary page created on the master server 304 for a specific, and usually temporary, purpose. A "stub" page can be created, for example, as a subsidiary page of a user page. After the creation of the stub page in step 378, process control is directed to step 374 to cause Netscape or the like to jump to the page. Again, the process is complete at 376.

While this invention has been described in terms of several preferred embodiments, there are alterations, permutations, and equivalents which fall within the scope of this invention. It should also be noted that there are may alternative ways of implementing both the process and apparatus of the present invention. However, such modifications will become readily apparent to those skilled in the art after studying preceding descriptions and studying the drawings. It is therefore intended that the following appended claims be interpreted as encompassing all such alterations, permutations, and equivalents as fall within the true spirit and scope of the present invention.

What is claimed is:

1. A voice web browser system comprising:

a telephone;

an access system coupled to a TCP/IP network, said TCP/IP network comprising a plurality of nodes, said TCP/IP network providing access to web pages stored on computer systems coupled to said TCP/IP network, said web pages comprising HTML code that can be transmitted via TCP/IP packets to said access system over said TCP/IP network, said access system being able to receive said TCP/IP packets and to parse said HTML code into text and non-text portions;

memory coupled to said access system including computer executable instructions for:
   (a) retrieving a web page via a network browser including a parser, a converter and a player;
   (b) selecting at least one audio advertisement; and
   (c) playing said selected at least one audio advertisement to a user of said telephone;

a telephone system coupling said telephone to said access system for interactive communication with said access system; and a text-to-speech system associated with said access system for reading at least some of said text to a user of said telephone.

2. A voice web browser system as recited in claim 1 wherein said telephone is a touch-tone telephone, and wherein said access system can be provided with commands in the form of DTMF signals.

3. A voice web browser system as recited in claim 1 further comprising a speech recognition system responsive to spoken commands from said telephone user and operative to provide operational commands to said access system.

4. A voice web browser system as recited in claim 1 wherein said access system consists of a unitary computer system.

5. A voice web browser system as recited in claim 1 wherein said access system comprises an interface computer system coupled to said telephone user by said telephone system, and a server system coupling said interface computer system to said TCP/IP network.

6. A voice web browser as recited in claim 1 wherein said access system is responsive to commands from said telephone user for navigating both within a web page and between web pages of said TCP/IP network.

7. A computer implemented process for obtaining web page information over a TCP/IP network comprising:
- implementing a connection of a telephone user to an access system that is coupled to a TCP/IP network;
- detecting a selection of at least one navigation command by said telephone user to access a web page accessible over said TCP/IP network; and
- navigating over said TCP/IP network to said web page in response to said navigation command, resulting in a verbal communication of at least some information derivable from said web page to said telephone user;
- selecting at least one audio advertisement; and
- playing said at least one selected audio advertisement to said telephone user.

8. A computer implemented process as recited in claim 7 further comprising making an initial verbal contact with said telephone user after implementing a connection.

9. A computer implemented process as recited in claim 8 wherein said initial verbal contact includes providing a plurality of options to the telephone user.

10. A computer implemented process as recited in claim 9 wherein said plurality of options includes navigating the TCP/IP network and the sending or receiving of e-mail.

11. A computer implemented process as recited in claim 10 wherein said plurality of options further includes creating a web page on said TCP/IP network.

12. A computer readable media encoded with the computer implemented process of claim 7.

13. A voice web browser comprising:
- connection means for implementing a connection of a telephone user to an access system that is coupled to a TCP/IP network;
- means for detecting a selection of at least one navigation command by said telephone user to access a web page accessible over said TCP/IP network;
- means for navigating over said TCP/IP network to said web page in response to said navigation command, resulting in a verbal communication of at least some information derivable from said web page to said telephone user;
- means for selecting at least one advertisement; and
- means for playing said at least one selected advertisement.

14. A voice web browser as recited in claim 13 further comprising means for making an initial verbal contact with said telephone user after implementing a connection.

15. A voice web browser as recited in claim 13 wherein said means for making an initial verbal contact includes means for providing a plurality of options to the telephone user.

16. A voice web browser as recited in claim 12 further comprising means for creating a web page accessible via said TCP/IP network.

17. A method for retrieving e-mail that was sent over a TCP/IP network comprising:
- calling by a user from a user telephone to an access computer coupled to a TCP/IP network;
- providing user identification by said user to said access computer;
- playing an audio advertisement to said user over said user telephone under the control of said access computer;
- receiving an indication at said access computer that said user would like to have e-mail that was transmitted over said TCP/IP network read via a text-to-speech process and;
- reading said e-mail as retrieved by said access computer to said user utiliziing a text-to-speech system.

18. A method for retrieving e-mail as recited in claim 17 further comprising providing at least one command to said access computer via a DTMF signal developed by said user telephone.

19. A computer readable media encoded with software instructions and data to implement the method of claim 17.

20. A system for retrieving e-mail that was sent over a TCP/IP network comprising:
- an access computer means coupled to a TCP/IP network, said access computer means being accessible by a user via a user telephone;
- means for providing user identification to said access computer means;
- means for retrieving e-mail via said access computer means that was sent over said TCP/IP network and addressed to said user;
- means for selecting at least one advertisement;
- means for playing said at least one selected advertisement; and
- means for reading said e-mail to said user of said user telephone.

* * * * *